United States Patent [19]
Douskey et al.

[11] Patent Number: 6,115,763
[45] Date of Patent: Sep. 5, 2000

[54] MULTI-CORE CHIP PROVIDING EXTERNAL CORE ACCESS WITH REGULAR OPERATION FUNCTION INTERFACE AND PREDETERMINED SERVICE OPERATION SERVICES INTERFACE COMPRISING CORE INTERFACE UNITS AND MASTERS INTERFACE UNIT

[75] Inventors: Steven Michael Douskey; Michael Charles Cogswell; Guy Richard Currier; John Robert Elliott; Sharon Denos Vincent; James Maurice Wallin, all of Rochester; Paul Leonard Wiltgen, Kasson, all of Minn.

[73] Assignee: International Business Machines Corporation, Armonk, N.Y.

[21] Appl. No.: 09/035,490

[22] Filed: Mar. 5, 1998

[51] Int. Cl.[7] ............................ G06F 13/00; G06F 11/00; G01R 31/28

[52] U.S. Cl. .............................. 710/72; 710/20; 710/62; 714/30; 714/726; 714/727; 714/733; 714/734

[58] Field of Search ........................ 395/183.06, 500.49; 714/726, 727, 733, 734, 30; 710/20, 21, 62, 72, 240, 244

[56] References Cited

U.S. PATENT DOCUMENTS

| | | | |
|---|---|---|---|
| 4,639,919 | 1/1987 | Chang et al. | 371/27 |
| 5,640,337 | 6/1997 | Huang et al. | 364/578 |
| 5,668,817 | 9/1997 | Adham | 371/22.4 |
| 5,724,502 | 3/1998 | Cherichetti et al. | 395/183.04 |
| 5,768,152 | 6/1998 | Battaline et al. | 364/551.01 |
| 5,809,036 | 9/1998 | Champlin | 371/22.31 |
| 5,848,264 | 12/1998 | Baird et al. | 395/500 |
| 5,862,152 | 1/1999 | Handly et al. | 371/22.32 |
| 5,969,538 | 10/1999 | Whetsel | 324/763 |
| 5,974,578 | 10/1999 | Mizokawa et al. | 714/727 |
| 5,991,898 | 11/1999 | Rajski et al. | 714/30 |
| 6,000,051 | 12/1999 | Nadeau-Dostie et al. | 714/727 |

OTHER PUBLICATIONS

Chandramouu, R. et al., "Testing systems on a chip", *IEEE Spectrum*, (Nov., 1996), pp. 42–47.

Day, L.L. et al., "Micro Token Ring", *IBM® Technical Disclosure Bulletin*, vol. 37, No. 9, (Sep., 1994), pp. 485–486.

(List continued on next page.)

*Primary Examiner*—Thomas C. Lee
*Assistant Examiner*—Tanh Nguyen
*Attorney, Agent, or Firm*—Scott Stinebruner; Wood, Herron & Evans

[57] ABSTRACT

A data processing system, integrated circuit device, program product, and method thereof utilize a service interface to provide external access to a plurality of cores integrated into an integrated circuit device. The service interface, which may be utilized to perform external data transfer through a service access port in connection with a predetermined service operation, is separate from any function interface that is utilized during regular operation of the device. The service interface includes a plurality of core interface units integrated with selected cores on the device and coupled to the service access port through a master interface unit that is configured to request at least one of the core interface units to initiate execution of a predetermined service operation. As such, a multitude of service operations may be initiated in any number of the cores through a common service access port without occupying a large number of I/O pins and without necessitating interruption of the regular operation of the device.

67 Claims, 16 Drawing Sheets

OTHER PUBLICATIONS

Whetsel, Lee, Built–in Self–Test (BIST) Using Boundary Scan, Texas Instruments Incorporated, SCTA043A, (Dec. 1996).

Whetsel, Lee, Hierarchically Accessing 1149.1 Applications in a System Environment, Texas Instruments Incorporated, SCTA033, Proceedings of International Test Conference, Baltimore, MD (Oct. 17–21, 1993), IEEE reprinted with permission (1993), pp. 1–12.

Texas Instrument Incorporated, 'ABT8996 Addressable Scan Port (ASP) Product Literature, (1996).

Texas Instruments Incorporated, IEEE1149.1 (JTAG) Boundary–Scan Logic Products Literature, SCTB042, (1996).

Texas Instruments Incorporated, SN54ABT8996, SN74ABT8996 10–Bit Addressable Scan Ports Multidrop–Addressable IEEE STD 1149.1 (JTAG) TAP Transceivers Product Information, SCBS489B—Aug. 1994 (Rev. Dec. 1996), pp. 1–40.

Texas Intruments Incorporated, Data Formats, http://www.ti.com/sc/docs/jtag/format.htm (downloaded Nov. 21, 1997).

Texas Instruments Incorporated, IEEE Std 1149.1 (JTAG) Testability Primer, Semiconductor Group (1997).

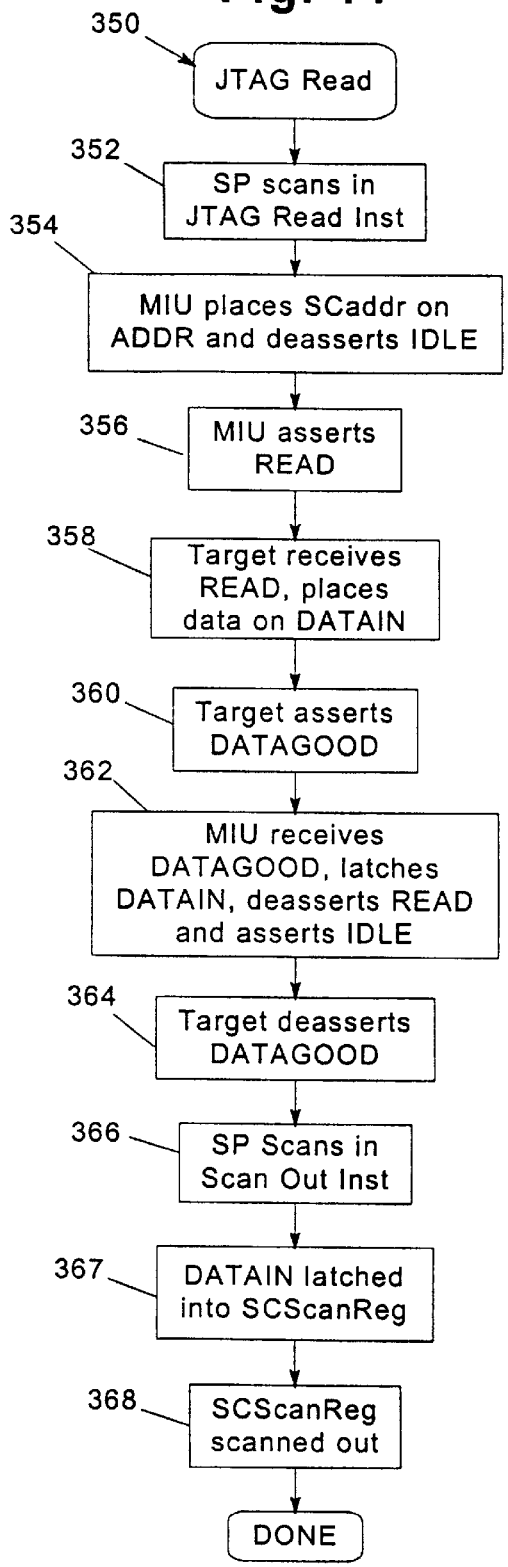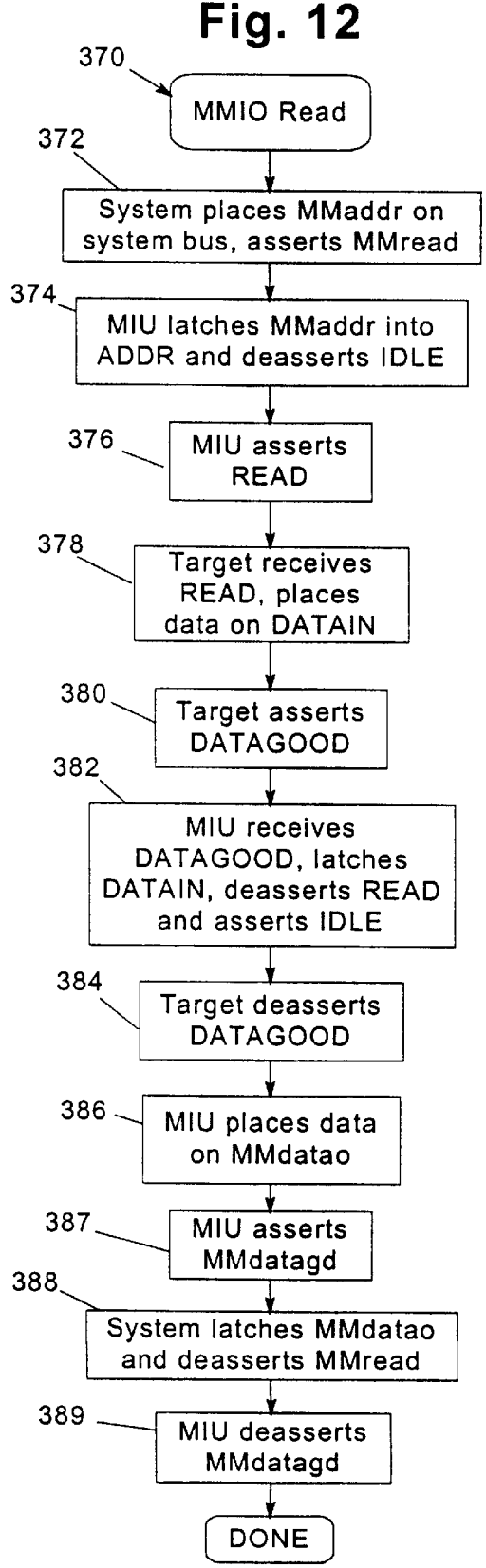

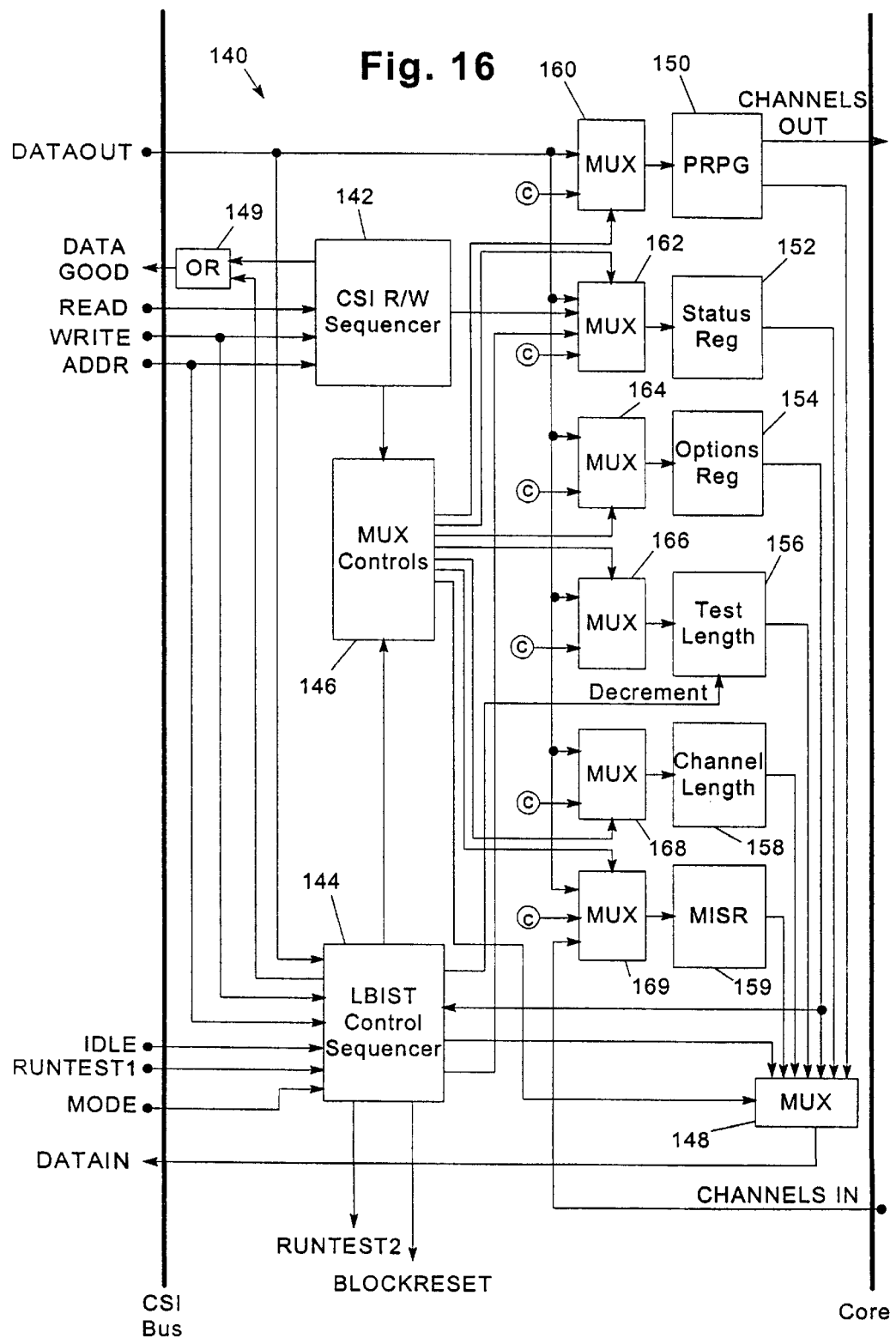

MULTI-CORE CHIP PROVIDING EXTERNAL CORE ACCESS WITH REGULAR OPERATION FUNCTION INTERFACE AND PREDETERMINED SERVICE OPERATION SERVICES INTERFACE COMPRISING CORE INTERFACE UNITS AND MASTERS INTERFACE UNIT

FIELD OF THE INVENTION

The invention is generally related to integrated circuit device architecture and design, and in particular to the architecture and design of an integrated circuit device including a plurality of integrated cores.

BACKGROUND OF THE INVENTION

Integrated circuit devices, commonly known as chips, continue to become more powerful and complex as semiconductor manufacturing technologies have advanced. Whereas early integrated circuit devices included fewer than one hundred transistors, it is now common to integrate several million transistors into a single integrated circuit device. This increased chip density enables some operations that once required several integrated circuit devices to now be implemented in a single integrated circuit device, often providing greater performance at a lower cost. For example, where previously a data processing system might require separate integrated circuit devices for a microprocessor, a memory, a bus interface, and a memory controller, advances in chip density now permit all of these functions to be integrated into the same integrated circuit device. Such devices are typically known as "systems on a chip" due to the high level of integration they provide.

Increases in chip density have also significantly affected the design methodology for integrated circuit chips. When the number of transistors in a particular design was relatively low, it was not particularly difficult for a designer to layout the individual transistors and test the design. As the number of transistors in designs increased, however, the use of cell-based design became more prevalent. With cell-based design, a circuit designer lays out an integrated circuit device design by connecting together a number of pre-defined "cells". Each cell includes a plurality of transistors that have been integrated together to perform a predefined function. Cells can be maintained in a library, so that a designer can often build a design simply by assembling together cells of transistors, rather than laying out each transistor individually. Moreover, performance and reliability is often improved since each cell can be thoroughly optimized and tested prior to reuse in other designs.

As more complex designs have been developed, the functions incorporated into cells have also become more complex. Particularly complex cells that perform more complex functions are often referred to as "embedded cores", or simply cores. Whereas a cell may represent a relatively simple function such as a logical AND gate or a multiplexer, a core typically represents a more complex function such as that of a processor, a controller, a memory, an interface circuit, or any other complex data processing circuit arrangement. One or more cores may be integrated together in a design, along with any custom-designed support circuitry that is necessary to integrate the cores together.

One advantage of cores is that, like cells, they may be thoroughly tested and simulated by a designer prior to incorporation into an end design. Moreover, cores are typically reusable in other designs so long as predefined interface requirements are met. Due to the significant resources that must to be devoted to designing and testing cores, the ability to reuse a core in other designs can significantly reduce the cost and development time for core-based integrated circuit designs. In fact, a significant market now exists for predefined and pretested cores, whereby many designers now design integrated circuit devices simply by assembling together "soft cores", or the software definition files that define how cores are laid out, developed by and purchased from other designers.

Another net effect of the increase in the complexity of integrated circuit devices is that testing the manufactured devices has become significantly more complex and time consuming. When multiple less-complex integrated circuit devices are utilized in a design, it is often possible to observe and verify the operation of individual devices through external input/output (I/O) pins on the devices. For example, a device may be designed with a boundary scan architecture integrated therein with a chain of registers coupled to the I/O pins of a device. With a boundary scan architecture, the current state of various pins in a device at any given time may be recorded and later accessed via external equipment to verify the operation of a manufactured device.

In addition, built-in self-test (BIST) circuitry may also be incorporated into individual devices to perform predetermined testing operations, e.g., upon power-up of a device. For example, for logic devices such as processors and controllers, logical built-in self-test (LBIST) circuitry may be used to pass pseudo-random test patterns through logic gates to verify their correct operation. For memory arrays, array built-in self-test (ABIST) circuitry may be used to apply test patterns through array elements to verify their operation.

Furthermore, at the chip level and higher, a standard interface, known as the Joint Test Action Group (JTAG) interface (IEEE Std. 1149.1) has been developed to facilitate external access to integrated circuit devices. With a JTAG-compatible integrated circuit device, a standardized test access port (TAP) is provided that permits boundary scan operations to be performed in response to commands issued by an external TAP controller through the TAP port of the device, with the results output back through the same port. Through the standardized interface, card-level and system-level testing is also permitted by interfacing TAP controllers with multiple chips or cards.

Core-based designs, however, introduce new concerns that are not adequately addressed with many testing methodologies. In particular, as designs become more complex, the number of transistors has increased at a greater rate than the number of I/O pins, and thus, it is more difficult to observe the internal operation of such devices. In addition, many cores, e.g., embedded memories, may not be externally accessible at all, and thus may not be tested using external test equipment. Moreover, if BIST is used, different cores may require different BIST circuitry that requires different test methodology and different timing and clock requirements. Furthermore, given that a multi-core design may be based upon cores developed by different entities, there is currently no assurance that any BIST circuitry will be compatible with the other BIST circuitry in a design.

Chip-level and higher interfaces such as the JTAG interface are not readily suited for use with testing multi-core designs since to do so, such interfaces would require individual cores to utilize separate JTAG controllers, thereby requiring controller circuitry to be replicated multiple times on an integrated circuit device, as well as dedicated I/O pins for each controller. Also, such interfaces are not designed to permit multiple, switchable master controllers on the same interface, which may further increase the amount of additional replicated circuitry that would be required to access multiple cores on an integrated circuit device. Considering the expense of additional circuitry and I/O pins that would be required to implement such an interface for this purpose, therefore, significant drawbacks would exist with this approach.

The difficulties in testing core-based designs also raises a broader issue of providing external access to embedded cores for purposes other than testing. Currently, unless specifically tied to a functional interface such as a system bus or direct I/O port, no suitable manner exists for accessing an embedded core. For example, it may be desirable to perform various "service" functions with an integrated circuit device, e.g., integrity testing during manufacturing, reliability testing in operation (e.g., power-on testing), serviceability access (e.g., for configuring a device upon power-up, isolating error conditions or verifying a hardware field repair or upgrade), and early system bring up debug, among others.

Using a functional interface such as a system bus, to perform these service functions typically occupies processing bandwidth and thereby interrupts the normal operation of a device and decreases its performance. Moreover, given the limited number of I/O pins available on most devices, using a direct I/O pin for a service function is often not feasible.

Therefore, a significant need exists for an improved manner of providing external access to embedded cores in a multi-core integrated circuit device, and specifically for the purpose of facilitating testing and other service operations with the embedded cores.

SUMMARY OF THE INVENTION

The invention addresses these and other problems associated with the prior art by providing a data processing system, integrated circuit device, program product, and method thereof utilizing a service interface to provide external access to a plurality of cores integrated into an integrated circuit device. The service interface, which may be utilized to perform external data transfer through a service access port in connection with a predetermined service operation, is separate from any function interface that is utilized during regular operation of the device. The service interface includes a plurality of core interface units integrated with selected cores on the device and coupled to the service access port through a master interface unit that is configured to request at least one of the core interface units to initiate execution of a predetermined service operation. As such, a multitude of service operations may be initiated in any number of the cores through a common service access port without occupying a large number of I/O pins and without necessitating interruption of the regular operation of the device.

The invention addresses additional concerns associated with the prior art by providing a program product and method for use in testing a multi-core integrated circuit device design in which an interface behavior model is coupled between a core service interface circuit arrangement and a core/test interface unit circuit arrangement. The interface behavior model is configured to test a bus operation between the master interface unit circuit arrangement and the core/test interface unit circuit arrangement by intercepting the bus operation. In this manner, a robust, modular test environment is provided in which a wide variety of core service interface and/or core/test interface unit circuit arrangements may be tested irrespective of the particular designs thereof, thereby enabling thorough and efficient verification of a wide variety of multi-core integrated circuit device designs.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

BRIEF DESCRIPTION OF THE DRAWING

FIG. 11 is a flowchart illustrating the program flow of a JTAG read operation performed by the core service interface of FIG. 7.

FIG. 12 is a flowchart illustrating the program flow of a MMIO read operation performed by the core service interface of FIG. 7.

FIG. 16 is a block diagram of the LBIST core interface unit of FIG. 7.

DETAILED DESCRIPTION

Figure 1:
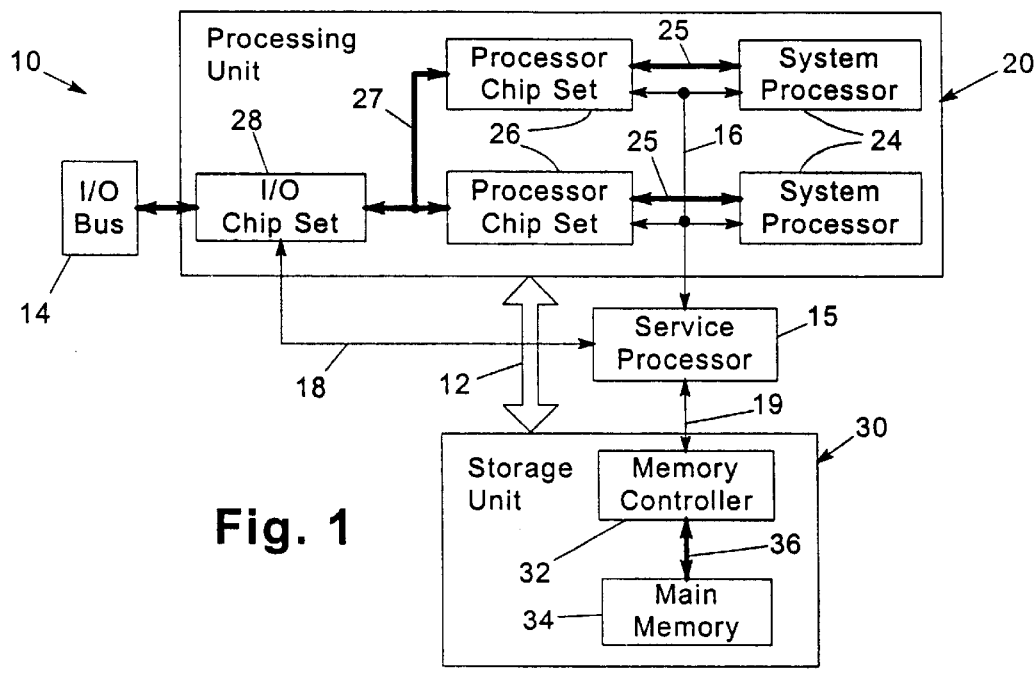
FIG. 1 is a block diagram of a data processing system consistent with the invention.

Turning to the Drawing, wherein like numbers denote like parts throughout the several views, FIG. 1 illustrates the general configuration of an exemplary data processing system 10 suitable for implementation of a service interface consistent with the invention. System 10 generically represents any of a number of multi-user or stand-alone computer systems such as network servers, midrange computers, mainframe computers, workstations, desktop computers, portable computers, and the like. Data processing system 10 may also be implemented in other types of computing devices, e.g., in embedded controls for any number of electronically-controlled devices. One suitable implementation of data processing system 10 is in a midrange computer such as the AS/400 computer available from International Business Machines Corporation.

Data processing system 10 generally includes a processing unit 20 coupled to a storage unit 30 through a bus 12. Within processing unit 20 may be one or more system processors 24, as well as necessary support circuitry for each processor, e.g., as represented by chip set blocks 26 coupled to processors 24 by buses 25. Also shown is an input/output (I/O) chip set 28, coupled to the processor chip set blocks 26 over a bus 27, that handles interface with an I/O bus 14. Other support circuitry, e.g., to handle network and/or terminal interfaces, power management, mass storage, etc. may also be incorporated into processing unit 20.

Storage unit 30 typically includes a memory controller 32 that provides an interface between processing unit 20 and a main memory 34 for the data processing system. Memory 34, which is coupled to controller 32 over a bus 36, is typically a bank of random access memory, although in the alternative, a memory may be implemented in local or mass storage devices such as hard disk drives, magnetic tapes, CD-ROMS, and a multitude of other storage media.

System 10 also includes a service processor 15 coupled to each of blocks 24, 26, 28 and 32 through buses 16, 18 and 19. Service processor 15 typically handles non-functional operations such as the configuration, testing and/or initialization of various components in data processing system 10.

It should be appreciated that the various blocks described in processing unit 20 and storage unit 30, as well as other blocks in the data processing system, may be implemented using one or more integrated circuit devices. Typically, any of these devices may implement a multi-core design consistent with the invention. As such, it should be appreciated that the invention should not be limited to use with any particular design or end use of an integrated circuit device.

As is known in the art, integrated circuit devices are typically designed and fabricated using one or more computer data files, referred to herein as hardware definition programs, that define the layout of the circuit arrangements on the devices. The programs are typically generated by a design tool and are subsequently used during manufacturing to create the layout masks that define the circuit arrangements applied to a semiconductor wafer. Typically, the programs are provided in a predefined format using a hardware definition language (HDL) such as VHDL, verilog, EDIF, etc. While the invention has and hereinafter will be described in the context of fully functioning integrated circuit devices and data processing systems utilizing such devices, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Figure 2:
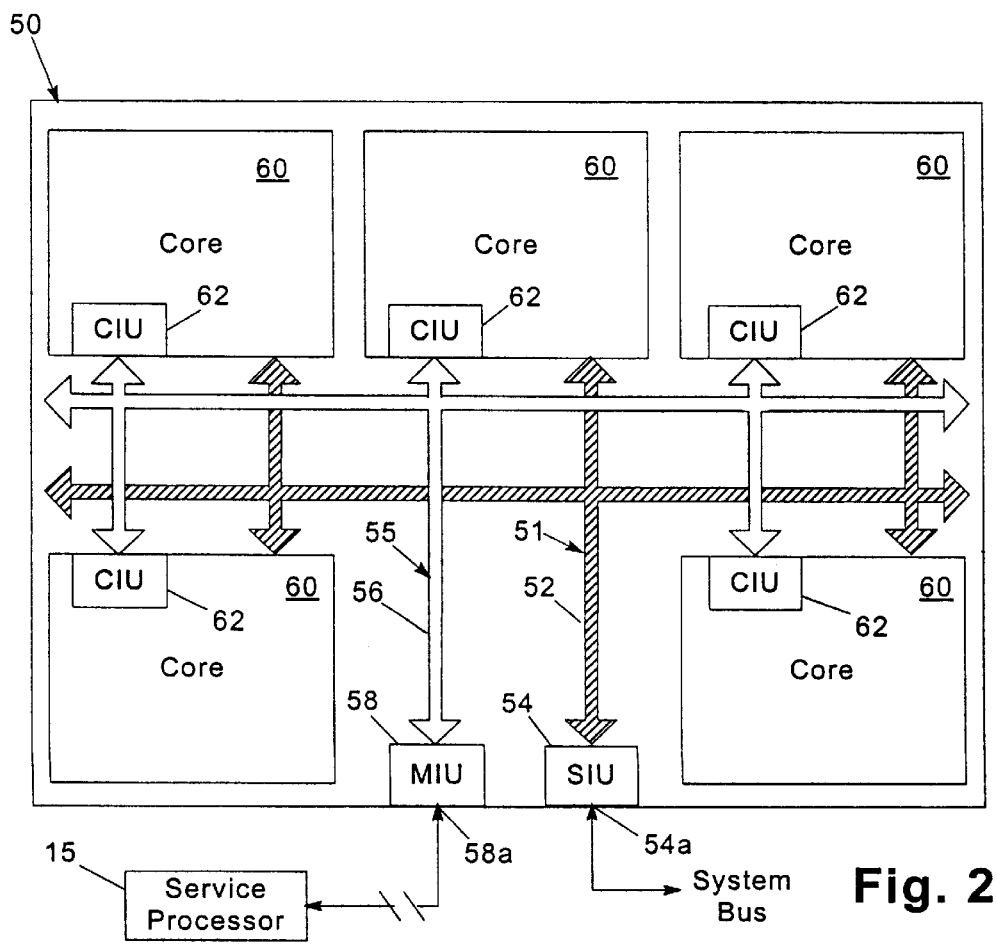
FIG. 2 is a block diagram of an integrated circuit device from the data processing system of FIG. 1.

FIG. 2 illustrates the configuration of one such integrated circuit device 50 consistent with the invention. Device 50 generally includes a plurality of cores 60 interconnected together via one or more functional interfaces, e.g., functional interface 51 utilizing bus 52. Bus 52 is coupled to an external interface such as the system bus via a system interface unit (SIU) 54 having an external function access port 54a.

Each core 60 may include a predefined circuit arrangement for performing one or more predefined tasks in device 50, e.g., a processor core, an embedded memory, an I/O interface core, memory interface, etc. Consistent with the invention, a core may be custom designed for a particular design, or may be reused from a previous design, whether generated internally within a business entity or licensed from another entity. Moreover, a core may be considered to include any custom circuit arrangement that is required to integrate together or extend the functionality of existing core designs for use in a particular custom design.

Generally, a functional interface represents one or more data paths through which data is typically transferred between cores and/or between a core and an external device during the regular operation of the integrated circuit device. It should be appreciated that multiple functional interfaces may be provided in an integrated circuit device, with each interface coupling together one or more cores with one another, one or more cores with one or more external devices, and combinations thereof. For example, device 50 is illustrated with a single functional interface 51 implemented as a bus 52 common to all cores 60 and functioning as an extension of a system bus. However, with other designs, purely internal functional interfaces may also be used between cores, e.g., the interface between a processor core and an embedded memory such as a cache, as well as direct ports between individual cores and various external devices. Moreover, it should be appreciated that additional "glue" and other custom circuitry, which may also be coupled to a functional interface, may also be disposed on device 50 to interconnect the cores as well as to provide additional functionality and/or support capabilities for the device.

Consistent with the invention, device 50 also includes a service interface, illustrated at 55, for handling predetermined service operations for the device. The service interface typically is utilized in providing external visibility to the internal architecture of device 50 primarily for non-functional purposes, e.g., relating to manufacturing/fabrication, reliability and/or serviceability of the device. Manufacturing/fabrication service operations include operations such as testing finished parts, quality control, failure debug, performance measurement and sorting, etc. Reliability service operations include operations such as power-on built-in self test (BIST), long-term reliability testing, software power on system tests, etc. Serviceability service operations include operations such as device configuration or customization, device initialization, field service hardware/software upgrades, fail isolation, etc. Other service related operations, which are typically not associated with the regular operation of the device, may also be handled through a service interface consistent with the invention.

Service interface 55 generally includes a bus 56 which couples a master interface unit (MIU) 58 to a plurality of core interface units (CIU's) 62 disposed in each of cores 60. MIU 58 is principally used to pass requests received externally from device 50 to one or more of CIU's 62 so that predetermined service operations are performed by the CIU's as required. MIU 58 defines a service access port 58a, which may be coupled to an external device, e.g., service processor 15 described above. Port 58a may also be utilized by other external devices, whether or not incorporated into a finished circuit arrangement with device 50. For example, among other external devices, test equipment may be coupled to port 58a during manufacture to verify proper operation of a fabricated part.

It should be appreciated that more than one service interface may be provided on device 50, and that only a portion of cores 60 may be coupled to any given service interface. It should also be appreciated that additional circuitry, whether or not integrated into a core, may also be coupled to a service interface consistent with the invention.

Core Service Interface Configuration

Figure 3:
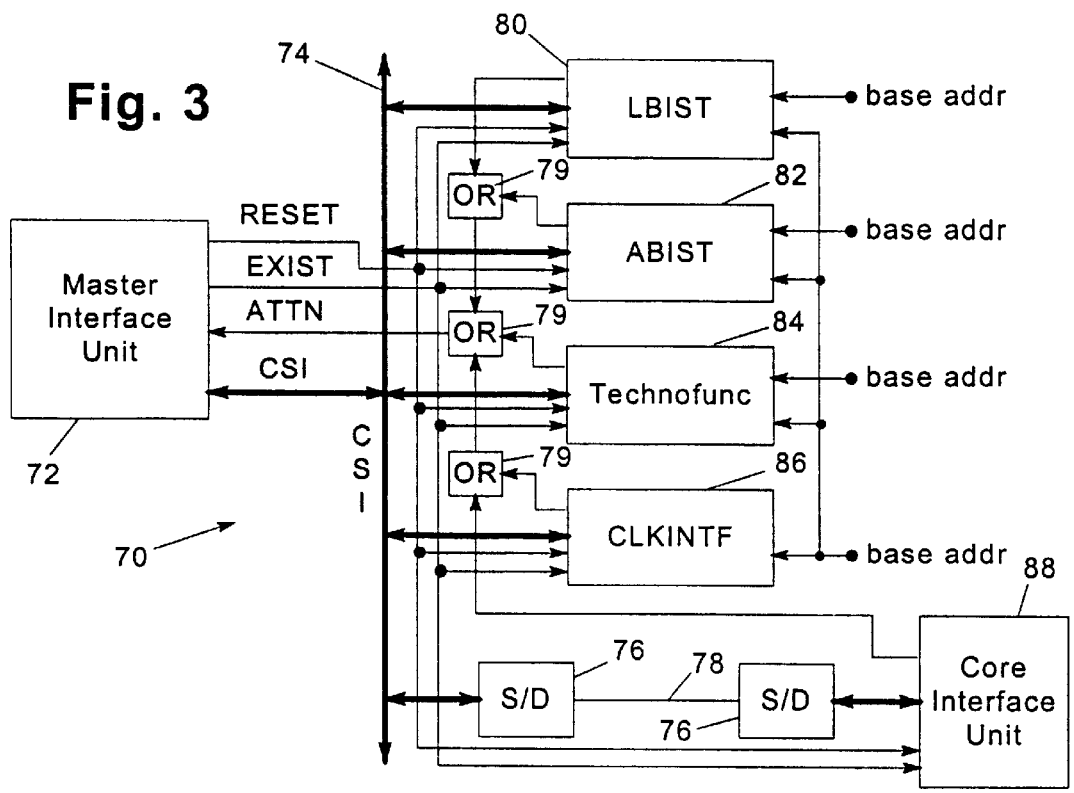
FIG. 3 is a block diagram of a core service interface consistent with the invention.

FIG. 3 illustrates as preferred implementation of a core service interface 70, including a master interface unit 72 coupled to a plurality of core interface units 80, 82, 84, 86 and 88 via a core service interface (CSI) bus 74. The core interface units may be more specifically designed to perform predetermined services or operations consistent with the invention, e.g., to function as test controllers, among others. For example, core interface unit 80 is illustrated as a logic built-in self-test (LBIST) controller that is used to perform testing of logic circuitry within a core. As another example, CIU 82 is configured as an array built-in self-test (ABIST) controller that is used to perform testing of array elements such as embedded memories. The precise manner of performing and implementing both LBIST and ABIST operations is well-known in the art.

A core interface unit may also be configured as a technical function, or a TECHNOFUNC controller 84. This type of controller provides technology dependent functions, e.g., to customize a device for different applications.

Yet another variation of a core interface unit is a clock interface, or CLKINTF controller 86, which is utilized to control the various clock trees within an integrated circuit device, as discussed in greater detail below.

Bus 74 is generally configured as a parallel multi-drop bus, with each interface unit coupled to the bus assigned a unique base address so that any unit attached to the bus is capable of passing information to another unit on the bus. Generally, each core interface unit is laid out proximate its associated core. As a result, it may be desirable in many situations to serialize a unit's coupling to bus 74 for cores located far from the MIU, e.g., as illustrated by serial line 78 coupled to bus 74 via serializer/deserializer block 76. It may be desirable for relatively long runs of bus 74 to be serialized so that the number of conductive traces routed over the long run is minimized. The use of a serialized bus is, in general, understood in the art, and thus, will not be discussed-in greater detail herein.

While any number of bus configurations may be utilized, one preferred configuration utilizes a 64-bit DATAOUT bus, a 64-bit DATAIN bus, and a 24-bit ADDR bus, with the first seven bits used as the base address for uniquely identifying an interface unit on the bus. In addition, four control/handshake signals, WRITE, READ, IDLE, and DATAGOOD may also be used in the bus. With this configuration, $2^7$, or 128 interface units are supported, each with $2^7$, or 128K valid addresses.

It may be desirable to utilize other control signals on bus 74 consistent with the invention. For example, it may be desirable to include a separate RESET signal from the master interface unit to the core interface units on the bus, such that when activated, all core interface unit activities stop and each unit returns to an idle state. Each interface unit may also leave internal operations going, e.g., leaving the system clocks on, or may suspend operations, e.g., like stopping BIST.

It may also be desirable to include a separate ATTN signal that is OR'ed from each CIU (e.g., by OR gates 79), and fed to the master interface unit to allow each core interface unit to flag errors. In response to the ATTN signal being asserted, the master interface unit may then read each core interface unit to discover the reason for the ATTN.

It may also be desirable to include an EXIST signal that facilitates a query operation to obtain status and identification information about all of the CIU's on the bus, discussed below with respect to FIG. 14.

Bus 74 preferably uses a four-phase asynchronous fully-handshake controlled interface. Also, the bus in the configuration disclosed herein may be operated with asynchronous or synchronous clocks with respect to the MIU clocks.

Figure 4:
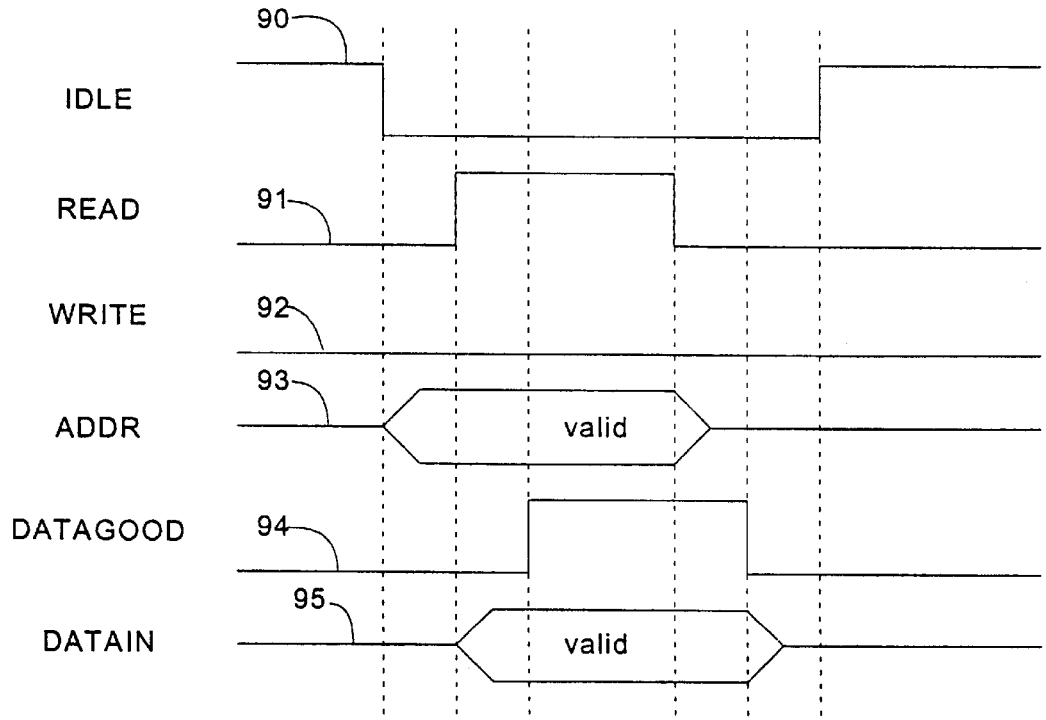
FIG. 4 is a timing chart illustrating the timing sequence of a read operation using the core service interface of FIG. 3.

FIG. 4, for example, illustrates the timing of a READ operation performed over the CSI bus. An IDLE signal 90 is utilized to permit re-use of the bus whenever the master interface unit is not controlling the bus. Thus, to initiate a READ operation, master interface unit 72 first drops IDLE signal 90, and thereafter the ADDR lines at 93 are driven to a predetermined address including the base address of the target CIU, as well as a unique address therein, e.g., corresponding to a specific register in that CIU. As shown in FIG. 3, each CIU includes a base address supplied thereto which uniquely identifies the CIU on the bus. In addition, the clock interface CIU 86 provides its base address to each other CIU on the bus so that such other CIU's can initiate a BOUNCE command, as discussed below.

Returning to FIG. 4, once the ADDR lines 93 are stabilized, MIU 72 initiates a READ operation by asserting READ line 91. Each CWU then samples the ADDR lines and decodes the base address to determine whether the request is directed to that particular CIU. If so, the appropriate data corresponding to the read request, i.e., the register specified in the address, is placed on the DATAIN lines 95. Then, the CIU handling the read operation asserts DATAGOOD line 94 as a handshake signal, indicating that the requested data is stable on the DATAIN lines 95. MW 72 then latches the data on DATAIN lines 95 and thereafter deasserts READ line 91. In addition, at this time the ADDR lines 93 may also be deasserted. Upon detection of READ line 91 being deasserted, the CIU handling the request deasserts DATAGOOD line 94, as well as DATAIN lines 95. Finally, upon detection of DATAGOOD line 94 being deasserted, MIU 72 may assert IDLE line 90, whereby the read operation is then complete and the bus is available for other requests.

Figure 5:
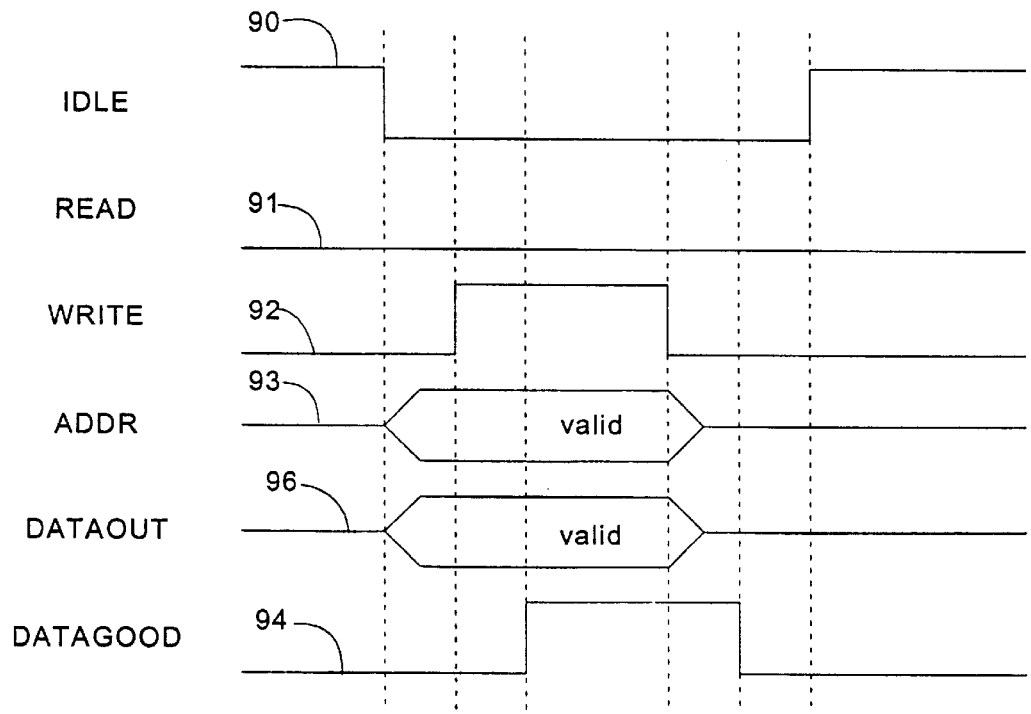
FIG. 5 is a timing chart illustrating the timing sequence of a write operation using the core service interface of FIG. 3.

As shown in FIG. 5, a WRITE operation proceeds in much the same manner as a READ operation. Specifically, MIU 72 initiates a WRITE operation by dropping IDLE line 90 and placing a desired address and output data respectively on ADDR lines 93 and DATAOUT lines 96. Once these lines have stabilized, MIU 72 asserts WRITE line 92. Each CIU on the bus then decodes the ADDR lines 93, and the appropriate CIU corresponding to the base address asserted in the request, then reads the DATAOUT lines 96 and performs a WRITE operation into the address specified on ADDR lines 93. Upon completion of this operation, DATAGOOD line 94 is asserted by the appropriate CIU. Upon detection of this handshake signal, MIU 72 then deasserts WRITE line 92, as well as the data on ADDR lines 93 and DATAOUT lines 96. Once WRITE line 92 is dropped, the CIU drops DATAGOOD line 94. Finally, MIU 72, upon detection of DATAGOOD being dropped, relinquishes control of the bus by returning to an idle state.

Figure 6:
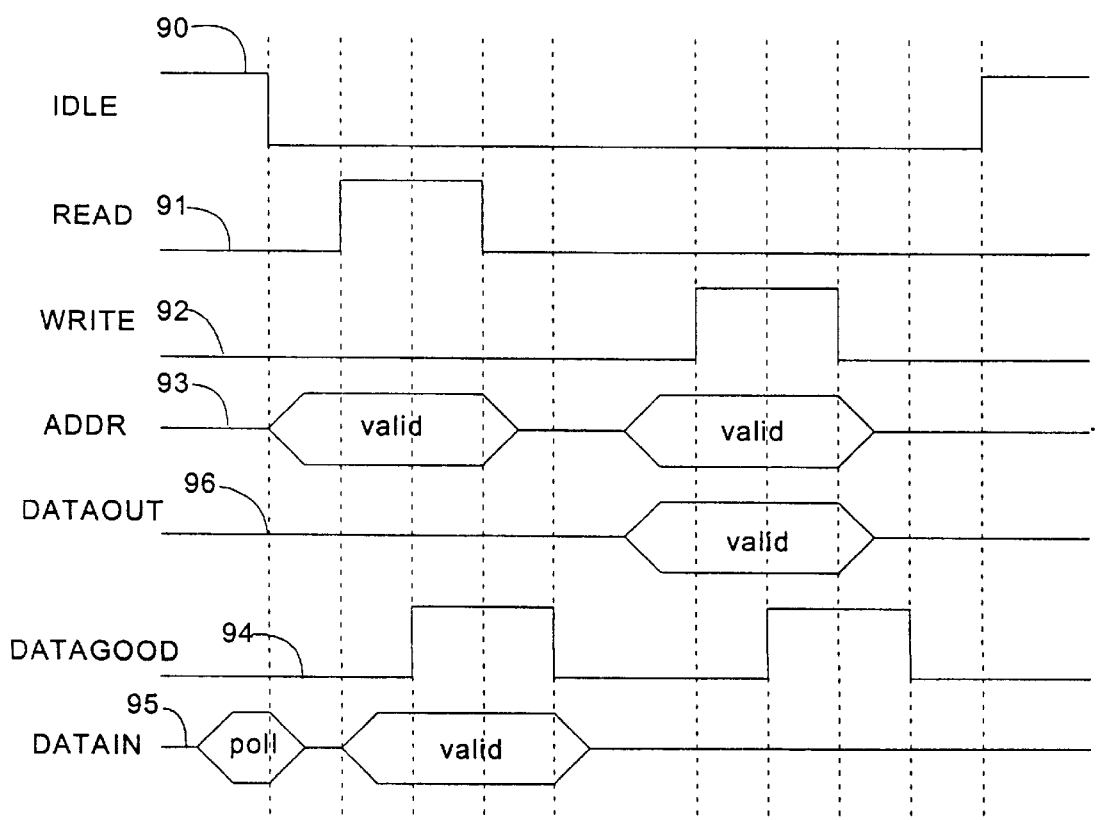
FIG. 6 is a timing chart illustrating the timing sequence of a bounce operation using the core service interface of FIG. 3.

As discussed above, it is also possible with the described configuration of bus 74 to enable specific CIU's to request operations to be performed on other CIU's on the bus. Specifically, in many instances, it is desirable for a CIU to request clock interface CIU 86 to perform a clock operation in association with other operations performed by the other CIU's. FIG. 6 illustrates the timing of a bounce operation that facilitates this additional functionality of bus 74. A bounce operation typically consists of a read of a CIU on the base address designated by the DATAIN signal during IDLE followed by a WRITE to the base address included in data received during the read operation.

In the preferred embodiment, the IDLE line 90 is driven by MIU 72. For a bounce operation, a requesting CIU waits until the line 90 indicates an IDLE state (or the line is asserted), and then places its base address on DATAIN lines 95. At this time, the requesting CIU may also store a command that the requesting CIU wishes to pass to another CIU in a predetermined register having a fixed offset from the base address of the requesting CIU.

Upon detection of the base address being placed on DATAIN lines 95, MIU 72 then deasserts IDLE line 90 and places an address on ADDR lines 93 consisting of the base address specified by DATAIN lines 95 plus a fixed offset representative of the address of the register containing the command to bounce to another CIU. Once this information has stabilized, MIU 72 asserts READ line 91, and in response, the requesting CIU places the command stored at the register specified by ADDR lines 93 on DATAIN lines 95. Once this data has stabilized, DATAGOOD line 94 is asserted, whereby MIU 72 latches the data, deasserts READ line 91 and ADDR lines 93. Upon detecting READ line 91 being dropped, the requesting CIU then drops DATAGOOD line 94 and deasserts the data on DATAIN lines 95.

Next, MIU 72 processes the command retrieved from the requesting CIU by performing a WRITE operation to the address specified in the request, placing the address at which to perform a WRITE operation on ADDR lines 93, and placing the data to be written to that address on DATAOUT lines 96. MIU 72 then asserts WRITE line 92, after which the target CIU detects and decodes the address such that the target CIU writes the data on DATAOUT lines 96 to the address specified on ADDR lines 93. Upon completion of this operation, DATAGOOD line 94 is asserted, and in response, MIU 72 drops WRITE line 92, as well as ADDR lines 93 and DATAOUT lines 96. In response, the target CIU drops DATAGOOD line 94, whereby the operation is complete. The IDLE line 90 is then reasserted by MIU 72 to complete the bounce operation.

The poll portion of the bounce operation may be performed in a number of alternate manners. For example, so long as the number of CIU's on the bus is equal to or less than the number of DATAIN lines 95, each CIU on the bus may be assigned to one of the DATAIN lines such that the base address of the requesting CIU may be decoded by determining which of the DATAIN lines is asserted. In the alternative, the base address of the requesting CIU may be driven on to all of the DATAIN lines 95. While simplifying the decode logic on the MIU, this would require additional handshake signals between the CIU's to guarantee that only one is driving the DATAIN bus at a time. For example, a daisy chain signal, passing a bit around a CIU chain with CIU's capturing the bit when they want the poll, may be used. In other embodiments, it may be desirable to add a line, or use one of the lines from the DATAIN bus 95 to indicate a valid poll address, which would be useful in asynchronous applications of the bus.

Automated Service Operation Sequencing

Figure 7:
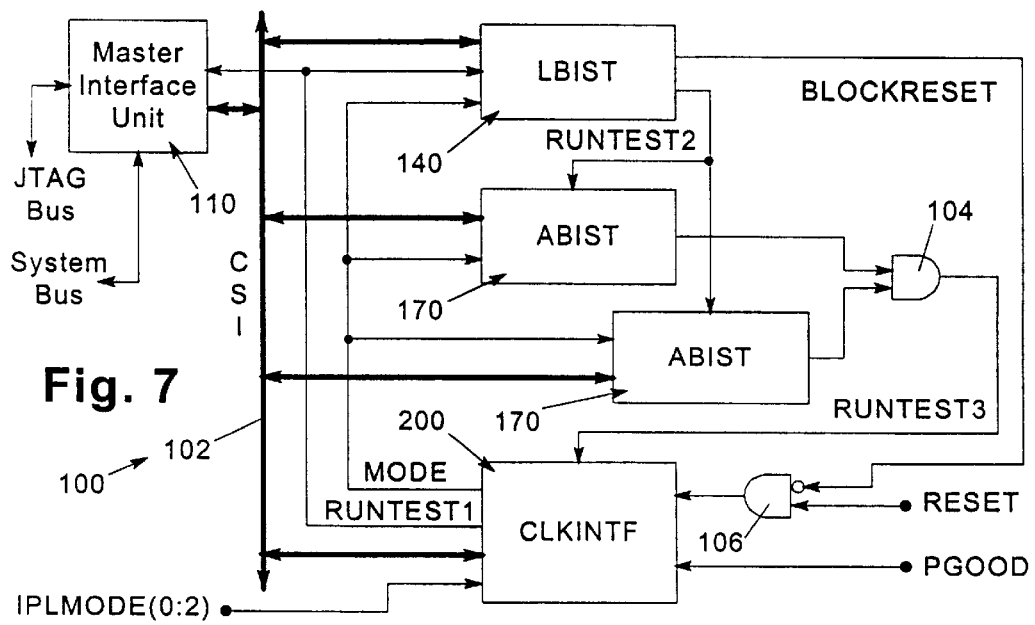
FIG. 7 is a block diagram of another core service interface consistent with the invention.

FIG. 7 illustrates another core service interface 100 in which the sequencing of built-in testing may be facilitated in a core service interface environment. In this embodiment, a master interface unit 110 is coupled to a plurality of core interface units 140, 170 and 200 through a core service interface bus 102. An automated sequence is performed by each CIU in sequence providing a daisy chained trigger signal to the next CIU in sequence upon completion of that CIU's operation.

MIU 110 is also coupled to a service bus implemented in this embodiment as a JTAG IEEE standard 1149.1 interface. In addition, as will be discussed below with reference to FIG. 9, MIU 110 may also optionally be coupled to a system bus to provide system access to the core service interface.

It should be appreciated that, using the core service interface 70 of FIG. 3, built-in test operations may be executed in response to commands supplied from an external access port to master interface unit 72. For example, if master interface unit 72 is, coupled to a JTAG-compatible test access port (TAP) JTAG-compatible commands may be issued to specific core interface units via MIU 72. However, in some circumstances, specifically during power-on of a data processing system, it may be desirable to eliminate the need to supply specific commands through MIU 72 to initiate tests in the various core interface units. Specifically, if dedicated commands are required to be issued to initiate a built-in self-test of any core interface unit, the testing operations are placed directly in the initial program load (IPL) path, thereby occupying service processor bandwidth during power-on.

Returning to FIG. 7, core service interface 100, however, provides a manner of implementing an automated test or service operation sequence that may be implemented independent of specific commands received by MIU 110. Beyond the advantage of running in parallel with other power-on tests during IPL, and thus decreasing the IPL time, this configuration would permit an integrated circuit device in a remote location to implement an automated sequence without connection to a specific external interface.

While the discussion hereinafter will focus on an automated test sequence, it should be appreciated that other service operations utilizing one or more of the core interface units coupled to a core service interface may be automated in the manner disclosed herein.

Figure 8:
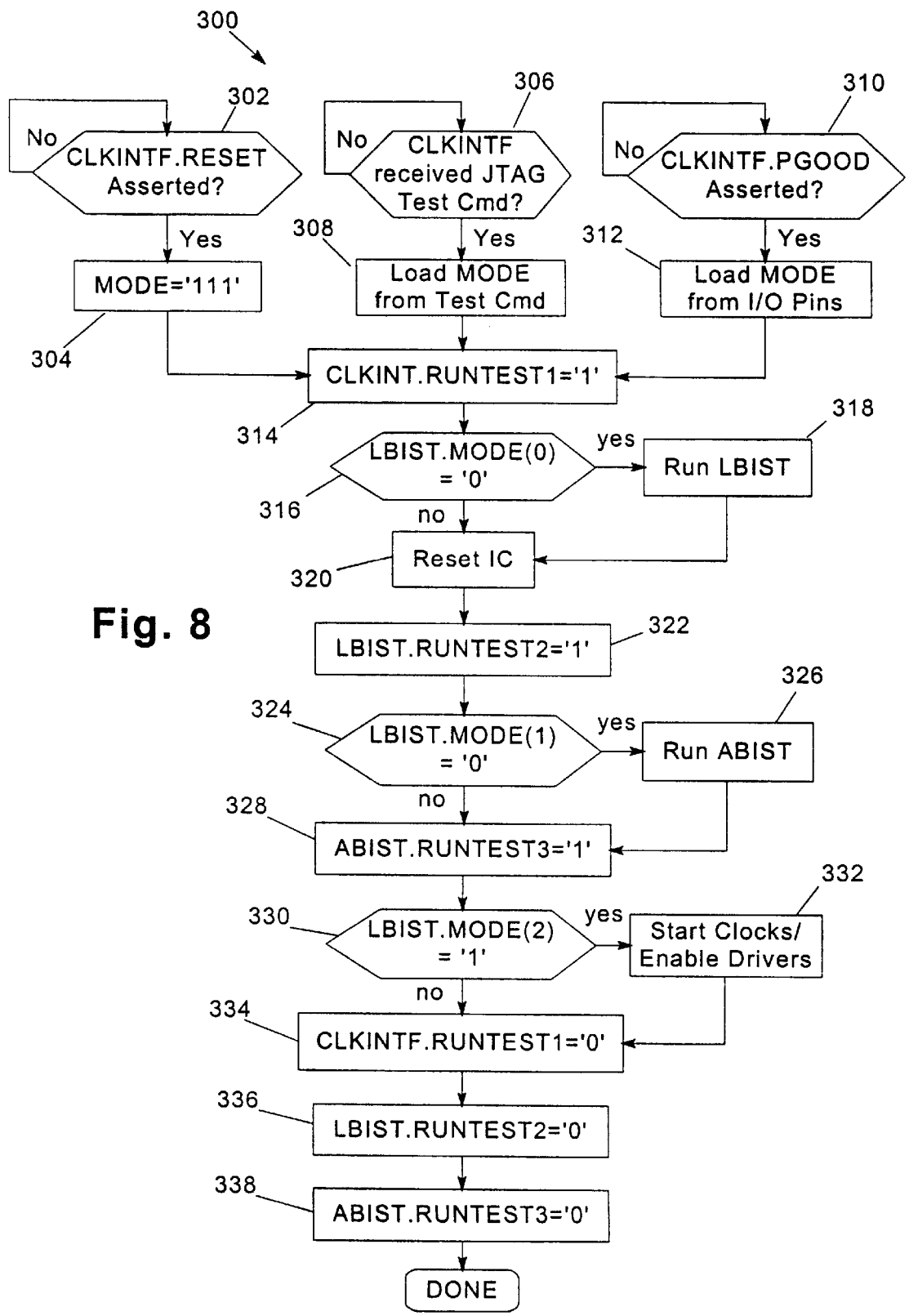
FIG. 8 is a flowchart illustrating the program flow of a power-on reset operation performed by the core service interface of FIG. 7.

As shown in FIG. 8, the sequence of predetermined service operations is generally performed by passing a daisy chain of test initialization signals (RUNTEST1, RUNTEST2 and RUNTEST3) between the various CIU's coupled to the CSI bus. CIU 200, which is implemented as a clock interface (CLKINTF) CIU, serves as the focal point for controlling the automated sequence. As illustrated by block 310, for example, CIU 200 may be responsive to a number of sequence initiation signals. One signal is a PGOOD signal (see FIG. 7) that is generated at system power-on via an external pin. The PGOOD signal may be generated, for example, by a service processor coupled to the integrated circuit device upon which core service interface 100 is implemented.

In the alternative, as illustrated by block 302, CIU 200 may initiate a sequence in response to a RESET signal generated internally in the integrated circuit device, which would permit, for example, an automated sequence to be initiated when no service processor is coupled to the device, or any other time that a system driven RESET is required. As shown in FIG. 7, the RESET signal is coupled to CIU 200 through an AND gate 106 to permit LBIST CIU 140 to block an inadvertent RESET from the integrated circuit device while LBIST is running and when diagnostic LBIST leaves the integrated circuit device in a random state. The BLOCKRESET, or block signal, prevents a system-generated RESET from occurring by virtue of the LBIST operation. It should be appreciated that a similar signal from an ABIST CIU may also be used to gate the RESET signal.

As illustrated by block 306 of FIG. 8, a third manner of initiating an automated sequence with CIU 200 is through a command received by MIU 110. One such command, for example, is a JTAG test command, among others. Typically, such a command is initiated by writing to a predetermined address in CIU 200.

Returning briefly to FIG. 7, CIU 200 also outputs three mode bits, MODE(0:2), to each of the other CIU's 140, 170 to define various alternative automated sequences to perform. CIU 200 also receives IPLMODE (0:2) signals externally from the integrated circuit device, e.g., from dedicated I/O pins on the integrated circuit device. Table I below describes the various operations performed in response to the various MODE signal combinations:

TABLE I

MODE Settings

| MODE(0:2) | Run LBIST | Run ABIST | Enable Drivers/ Start Clocks |
|---|---|---|---|
| 000 | yes | yes | no |
| 001 | yes | yes | yes |
| 010 | yes | no | no |
| 011 | yes | no | yes |
| 100 | no | yes | no |
| 101 | no | yes | yes |
| 110 | no | no | no |
| 111 | no | no | yes |

Based upon which process initiated an automated sequence, different MODE bits are output by CIU 200. As shown in FIG. 8, if a sequence is initiated by a RESET signal, block 302 passes control to block 304 to set the mode bits to "111", indicating that neither LBIST nor ABIST should be run, but that the drivers should be enabled and the clocks started. It has been found that it may be desirable to perform this sequence during a software RESET operation to prevent the LBIST and ABIST tests from being performed during a soft boot so as to not destroy the data that is currently stored in the integrated circuit device.

If a sequence is initiated by a command from the system, block 306 passes control to block 308 to load the MODE bits from a data field in the command, thereby enabling the system to customize the automated sequence. Also, if a sequence is initiated by a PGOOD signal, block 310 passes control to block 312 to load the MODE bits based upon the IPLMODE signals received from the I/O pins on the integrated circuit device.

Returning to FIG. 8, after the MODE bits are asserted by CIU 200 in one of blocks 304, 308 and 312, CIU 200 next asserts a RUNTEST1 signal in block 314 that is passed to a first CIU in the sequence—here LBIST CIU 140—to initialize the sequence to be performed via CIU 140. Next, as shown in block 316, when CIU 140 receives the RUNTEST1 signal, it takes one of two paths selected by MODE bit 0. A logic 0 indicates that an LBIST test is to be performed, and accordingly, the LBIST test is initialized in block 318 in response to the RUNTEST1 signal whenever a logic '0' is applied to MODE(0). Upon completion of the LBIST test, control passes to block 320 to reset the integrated circuit and clean up the chip scan rings in a manner known in the art. A logic '1' applied to MODE bit 0 bypasses the LBIST test, and passes control directly to block 320.

After the integrated circuit is reset in block 320, LBIST CIU 140 asserts the RUNTEST2 signal in block 322. The RUNTEST2 signal is received by each ABIST CIU 170 that are next in the automated sequence. As shown in block 324, CIU's 170 are responsive to bit '1' of the MODE signal, whereby if MODE bit 1 is a logical '0', the ABIST CIU's 170 perform the ABIST test in block 326, and upon completion pass control to block 328 to assert the RUNTEST3 signal in block 328. If MODE(1) is a logical '1', control is passed directly to block 328.

As illustrated in FIG. 7, it is possible to operate multiple CIU's 170 in parallel so that testing thereof is performed concurrently by multiple units. In such an instance, the trigger signal supplied to the next CIU in the chain is derived from a logical AND of the trigger signals applied from each parallel CIU 170, as illustrated by AND gate 104 which operates the RUNTEST3 signal. Other types of CIU's may also be coupled in parallel consistent with the invention.

When the RUNTEST3 signal is received by CLKINTF CIU 200, bit 2 of the MODE signal is tested in block 330 to determine whether to enable the drivers and start the clocks. If bit 2 is set to logical '1', the chip drivers and clocks are started in block 332, prior to passing control to block 334. Otherwise, the clock remains off, and the drivers remain disabled, by passing control directly to block 334.

As shown in block 334, the RUNTEST1 signal is next deasserted by CIU 200, thereby triggering LBIST CIU 140 to deassert RUNTEST2 in block 336, and in turn, triggering both ABIST CIU's 170 to deassert RUNTEST3 in block 338. After each trigger has been deasserted, the automated sequence is complete.

Various modifications may be made to the core service interface 100 consistent with the invention. For example, it should be appreciated that the IPLMODE inputs may be programmable hardwired inputs, solid hardwired inputs, or internal, software-driven inputs consistent with the invention. Also, it should also be appreciated that the specific sequence of LBIST, ABIST, and CLKINTF CIU's 140, 170 and 200 is merely exemplary in nature. Any number and sequence of CIU's may be automatically sequenced. Moreover, various serial and parallel arrangements may be utilized, and furthermore, other CIU configurations may be utilized as the master for the automated sequence, as well as individual elements in the automated sequence.

It may also be desirable to couple an output signal from CLKINTF CIU 200, e.g. the RUNTEST1 signal, directly to MIU 110. This would permit, for example, a sequence in progress status to be detectable by the MIU.

By tying the IPLMODE signals in various configurations, a wide variety of automated sequences may be performed consistent with the invention. For example, it may be desirable to tie bits 0 and 1 of the IPLMODE signal to low so that both LBIST and ABIST are executed upon power-on of the integrated circuit device. In addition, it may be desirable to couple bit 2 of the IPLMODE signal to an active low service processor detection signal such that, when a service processor is coupled to the integrated circuit device, the drivers are not enabled and the clock is not started upon completion of the automated sequence. Instead, the integrated circuit device waits to be started until a specific command is received from the service processor via MIU 110. If, on the other hand, no service processor is coupled to the integrated circuit device, the device is automatically started during the automated sequence by virtue of the logical '1' bit 2 of the IPLMODE signal.

By virtue of the flexibility imparted through the configurable automated sequence provided in core service interface 100, it should be appreciated that a wide variety of other testing and service processor sequences may be performed consistent with the invention. Other modifications will be apparent to one skilled in the art.

Merged System and Service Register Controls

In a number of applications, it may be desirable to multiplex memory-mapped READ and WRITE data (MMIO) from a system bus with a service interface to provide access to internal registers on an integrated circuit device. For example, in systems where a service processor is not used, a system bus often must have access to configuration, chip version-level, and self-test signatures.

Conventional approaches to merging multiple interfaces to an internal register on an integrated circuit device often require separate read/write controllers and decoders for each interface, with the read/write controllers in communication with one another to arbitrate collisions and provide a select signal to a multiplexer coupled to a particular internal register. The multiplexer for each internal register is selectable between a "FUNCTION" input representative of the normal data channel into the register, as well as separate inputs for each interface. As such, extra hardware is required to implement both controllers and both address decoders, as well as a 3:1 multiplexer being required for each internal register. However, the additional hardware may waste a significant amount of real estate on an integrated circuit device, as well as create implementation and documentation problems requiring strict discipline to assure proper data and address alignment between the two data paths.

Figure 9:
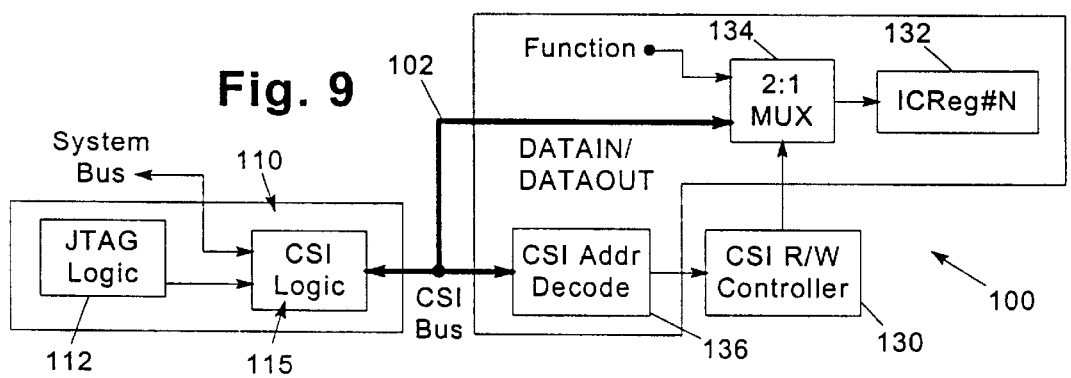
FIG. 9 is a block diagram illustrating the integration of a system bus with the core service interface of FIG. 7.

As shown in FIG. 9, however, a system bus may be granted access to internal registers of an integrated circuit device by multiplexing the bus with a service interface so that the amount of additional hardware required to access internal registers is reduced. Specifically, system bus data may be routed through master interface unit 110 to convert all such bus activity into core service interface bus cycles. MIU 110 includes a CSI logic block 115 that receives service interface signals from a JTAG logic block 112, as well as signals from the system bus. Collisions between system bus and service interface accesses are resolved once at the front end of CSI logic 115.

For each internal register to be accessed, e.g., as represented by internal register 132, the address and control signals from CSI bus 102 are passed to a CSI address decoder 136, which in turn passes an enable signal to a CSI read/write controller 130. A 2:1 multiplexer 134 is coupled between the DATAIN/DATAOUT buses of CSI bus 102 and internal register 132, with an alternate data path provided for the "function" or normal data path for the register. The CSI read/write controller 130 provides the SELECT signal for multiplexer 134 such that, in response to an appropriate access request over CSI bus 102, the address of internal register 132 is decoded and the input of multiplexer 134 is diverted from the function data path to the CSI bus data path.

As opposed to conventional implementations, the implementation illustrated in FIG. 9 significantly reduces the amount of additional hardware necessary to provide external access to an internal register, as well as significantly simplifies control logic required thereby. Specifically, the data path multiplexer 134 is reduced from 3:1 down to 2:1. Moreover, a separate decoder for the system bus is eliminated, and the read/write control logic therefor is also simplified. The savings are repeated for each internal register, and thus, the advantages of the merged data path increase as the number of externally-accessible internal registers increases.

It should be appreciated that the coupling of each internal register to CSI bus 102 may be performed in addition to the coupling of various core interface units to the same bus. Accordingly, with this implementation, even greater flexibility for service-related operations is provided. An additional benefit of this implementation is that the system bus has visibility to all of the core service interface addressable registers, including those of the various core interface units. In addition, various internal registers which may have dedicated I/O ports (e.g., version-level registers), may also be accessed by moving the registers into the core service interface address space. In many instances, this permits separate outputs for the registers to be dropped, thereby reducing the number of external connections on the integrated circuit device.

In the alternative, it may also be desirable to connect an MMIO sequencer to the core service interface to allow "bounce" commands to be initiated from the system bus. However, such a design would complicate the master interface unit, raise bandwidth requirements thereof, and delay response to system bus READ operations.

Figure 10:
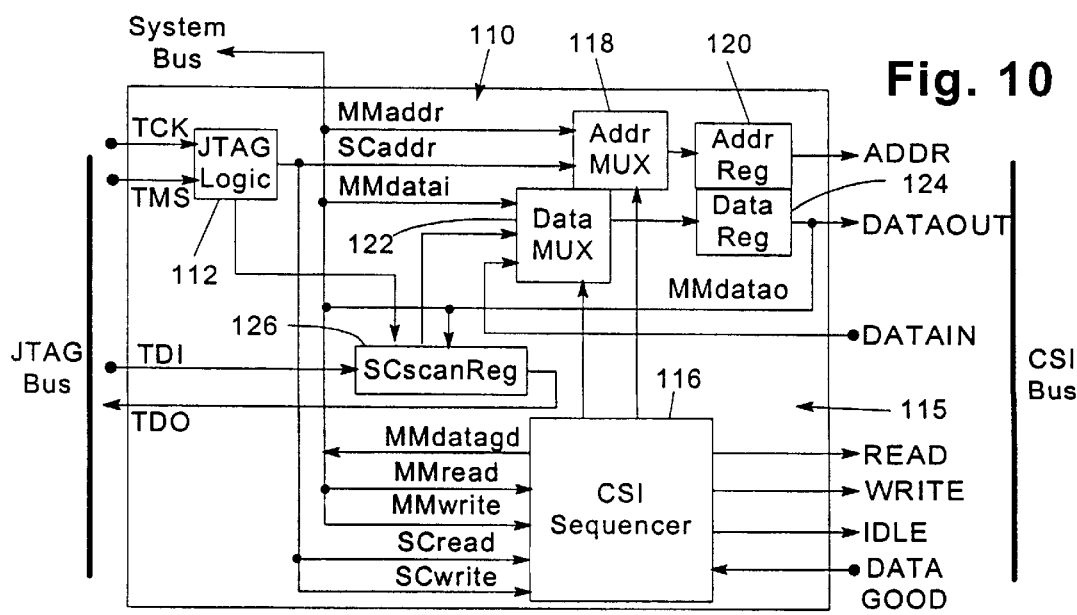
FIG. 10 is a block diagram of the Master Interface Unit of FIG. 9.

FIG. 10 illustrates the merged implementation of master interface unit 110 in core service interface 100. As shown in this figure, the CSI logic block 115 includes a CSI sequencer 116 that functions as a data path selection on it by providing control signals to an address multiplexer 11 8 and a data multiplexer 122, each of which respectively outputs address and data information to an address register 120 and data register 124.

As is well-known in the art, a JTAG interface is a serial interface in which data is input via a Test Data Input (TDI) data path and output via a Test Data Output (TDO) data path.

Two control signals, Test Clock (TCK) and Test Mode Select (TMS) signals are used to control a Test Access Port (TAP) controller state machine in JTAG logic block 112. Block 112 outputs SCaddr, SCread, and SCwrite signals as decodes from a JTAG instruction register (IR) therein, and a test data register (TDR) is implemented with a scan register, SCscanReg 126, which is also controlled by block 112. The configuration and usage of a TAP controller and a test data register, as well as of the JTAG standard in general, are well-known in the art, and thus, a more detailed description thereof need not be provided herein.

Address multiplexer 118 receives address signals from both the system bus (MMaddr) and JTAG logic block 112 (SCaddr). Depending upon the select signal provided by sequencer 116, multiplexer 118 outputs either of these data paths to the address register 120 to provide the address lines for the CSI bus. Data multiplexer 122 receives data lines from the system bus, as well as the DATAIN lines from the CSI bus and the contents of the JTAG Test Data Register (TDR), SCScanReg 126. One of these three data paths is coupled to data register 124 and is provided as the DATAOUT lines of the CSI bus.

The DATAOUT lines of the CSI bus are also coupled to the system bus to provide the DATAOUT information to the system bus via MMdatao, as well as to JTAG register 126. As such, data may be fed into register 126 in each successive JTAG bus cycle so that suitable data internal to the integrated circuit device is provided through the interface provided via a conventional JTAG bus. As a result, despite the wide variety of functions available through the core service interface, a wide variety of data may be provided in a suitable manner through a conventional JTAG interface.

CSI sequencer 116 receives separate read and write signals from both the system bus, in the form of MMread and MMwrite, and from the JTAG logic block 112, in the form of SCread and SCwrite. In turn, sequencer 116 outputs the READ, WRITE and IDLE control signals to the core service interface, as well as receives the DATAGOOD signal therefrom. Sequencer also outputs a MMdatagd signal back to the system bus to provide a handshaking signal for interfacing therewith.

FIGS. 11 and 12 respectively illustrate the sequence of events for read operations on an internal register via the JTAG and system bus interfaces. As shown in FIG. 11, a JTAG read operation 350 begins in block 352 where the service processor coupled to the JTAG interface scans in a JTAG read instruction into MIU 110 of FIG. 10 via the TDI line, with a portion of the instruction containing the read address specified by the command.

Next, in block 354, MIU 110 generates an address SCaddr on ADDR lines of the CSI bus, and deasserts IDLE. Next, in block 356, MIU 110 asserts the READ line on the CSI bus. Typically, this is performed by CSI sequencer 116 in response to an SCread signal applied by JTAG logic block 112.

Next, in blocks 358, 360, 362 and 364, a CSI READ operation, e.g., as discussed above with reference to FIG. 4, is performed to retrieve the requested data into register 126 via the DATAIN lines of the CSI bus. Specifically, in block 358, the target CIU specified by the JTAG command receives the READ signal, and in response, places the requested data on the DATAIN lines of the CSI bus. Next, in block 360, the target CIU asserts the DATAGOOD line, and in block 362, the MIU receives the DATAGOOD line, and in response, latches the DATAIN lines into data register 124 via an appropriate select signal to data multiplexer 122.

Next, CSI sequencer 116 deasserts the READ line and asserts IDLE, resulting in the target CIU deasserting the DATAGOOD line in block 364.

Next, in block 366, the service processor scans in a "scanout" instruction into the Instruction Register inside the JTAG logic block 112 via a JTAG operation. The modifier of the scanout instruction includes the address of register 126. Then, in block 367, the latched states of the DATAIN lines, stored in register 124, are latched into register 126, whereby the register may be scanned out in block 368 and subsequently out to the JTAG bus, thereby completing the READ operation.

FIG. 12 illustrates a read operation performed on the system bus, known as an "MMIO read" operation 370. The operation begins in block 372 by the system placing an address on the MMaddr lines of the system bus and asserting the MMread signal. Next, in block 374, the MIU latches the MMaddr lines into address register 120 to supply the ADDR lines of the CSI bus and deasserts IDLE. Next, in blocks 376, 378, 380, 382 and 384, a CSI READ operation is performed in the same manner as described above with respect to blocks 356, 358, 360, 362 and 364 of the JTAG read operation of FIG. 11.

Next, the data latched into data register 124 is placed on the MMdatao lines of the system bus in block 386, and a handshake signal data signal MMdatagd is asserted in block 387. In response to this signal, the system latches the MMdatao lines and deasserts the MMread like in block 358, resulting in the MIU deasserting MMdatagd in block 389. Upon completion of this latter step, the read operation is complete.

Figure 13:
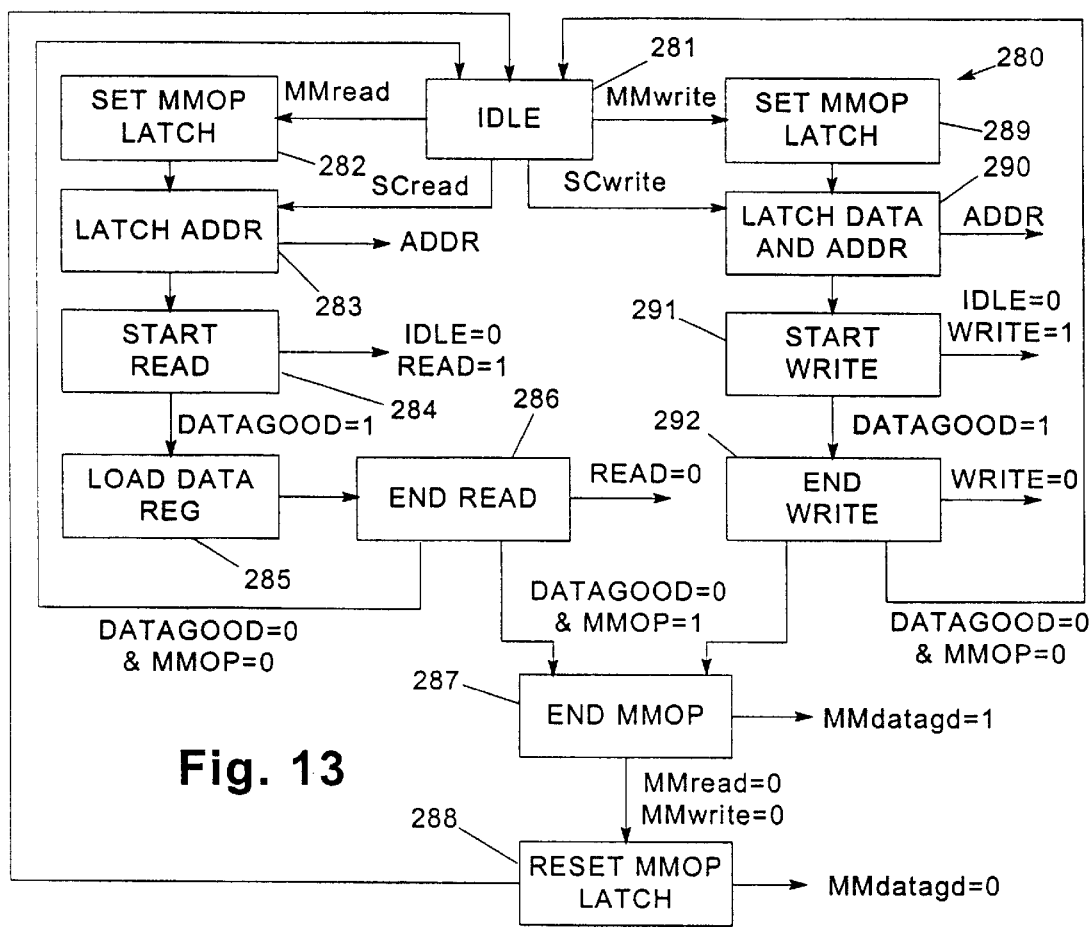
FIG. 13 is a state diagram illustrating the operation of the CSI sequencer of FIG. 10.

FIG. 13 illustrates a state diagram 280 for CSI sequencer 116 in greater detail. Sequencer 116 starts in idle state 281. The state transitions for handling read operations with sequencer 116 basically follow the flowcharts shown in FIGS. 11 and 12. For example, for a JTAG read, initiated by assertion of SCread, a transition occurs to state 283 to latch the address on SCaddr into address register 120. Next, state 284 begins the read operation by dropping IDLE and asserting READ on the CSI bus. In response to assertion of DATAGOOD by the target CIU, data register 124 is loaded in block 285 with the results of the read operation. Next, state 286 deasserts READ, and waits for DATAGOOD to be dropped by the target CIU. When it is, a state transition occurs back to IDLE state 281—due to the MMOP register not being set for a JTAG operation—whereby the JTAG read operation is then complete.

For an MMIO read operation, initiated by assertion of MMread, a state transition occurs to state 282 to set an MMOP latch, thereby indicating that an MMIO read operation is being performed. A state transition then occurs to states 283, 284, 285 and 286 to handle the CSI READ operation in the manner discussed above. However, upon deassertion of DATAGOOD, a state transition occurs from state 286 to state 287 due to the previous setting of the MMOP latch. In state 287, MMdatagd is asserted as a handshake to the system bus. Then, when both MMread and MMwrite are deasserted, a state transition occurs to state 288, which deasserts MMdatagd and transitions back to state 281, thereby completing the read operation.

For a JTAG write operation, initiated by assertion of SCwrite, a state transition to state 290 occurs, which latches address and data registers 120 and 124 respectively with the address present on SCaddr and the contents of register 126. Next, in state 291 a CSI write operation is initiated by dropping IDLE and asserting WRITE. The target CIU specified in the write operation then handles the operation and, when complete, asserts DATAGOOD to cause a state transition to state 292. In state 292, WRITE is deasserted, and when DATAGOOD is dropped by the target CIU, a state transition occurs back to state 281, indicating completion of the write operation. An MMIO write operation occurs in much the same manner, except that it is initiated by assertion of MMwrite, the MMOP latch is set in state 289 prior to transitioning to state 290, and deassertion of DATAGOOD in state 292 causes a state transition to states 287 and 288 to handle the handshaking with the system bus and clearing the MMOP latch in the same manner as with an MMIO read operation.

Core Service Interface Query Operations

As discussed above, it may be desirable to provide a master interface unit with the ability to locate and identify attached core interface units on a bus. So that a MIU may be implemented with more generic software routines that are adaptable for use in different environments, a core service interface consistent with the invention preferably includes the ability to poll the CSI bus to determine how many and what types of core interface units are attached to the bus. One preferred implementation maps each core interface unit to a single unique line on the DATAIN bus. Thus, with a 64-bit wide DATAIN bus, for example, up to 64 unique CIU's would be supported. Each CIU is also configured to assert its unique line on the DATAIN bus in response to a QUERY instruction, e.g., the EXIST signal applied to each CIU via MIU 72 in FIG. 3. Thus, when an MIU asserts a QUERY instruction, a map of all existing CIU's on the bus may be returned on the DATAIN bus. Then, an MIU may be configured to read a set offset into each base address to query a predetermined register in each CIU that is set aside to store data identifying the function and/or version level of the CIU at that address location. Consequently, it is possible for a MIU to acquire a record of the base address and type of each CIU coupled to the bus.

This concept may be expanded into other useful functions on the core service interface. For example, in lieu of stepping through reading each CIU in sequence to determine the source an ATTN signal, a separate QUERY ATTENTION signal may be supplied to each CIU with each CIU responding with a 1 on its dedicated DATAIN line if such CIU was the source of the ATTN signal. Other functions, e.g., a test completion indicator, a test in progress indicator, a test pass indicator, a test fail indicator, and other status information may be concurrently retrieved from all CIU's on a bus using this method.

In addition, rather than utilizing a dedicated line between an MIU and each CIU for the purpose of querying various registers in the CIU's, it may also be possible to issue "broadcast" requests to the various CIU's, whereby, if an address corresponding to a broadcast address is received by a CIU, the address decoder therefor would recognize the command issued by the MIU to be a broadcast request, whereby the CIU would then handle the request and supply the desired information on its assigned DATAIN line.

Figure 14:
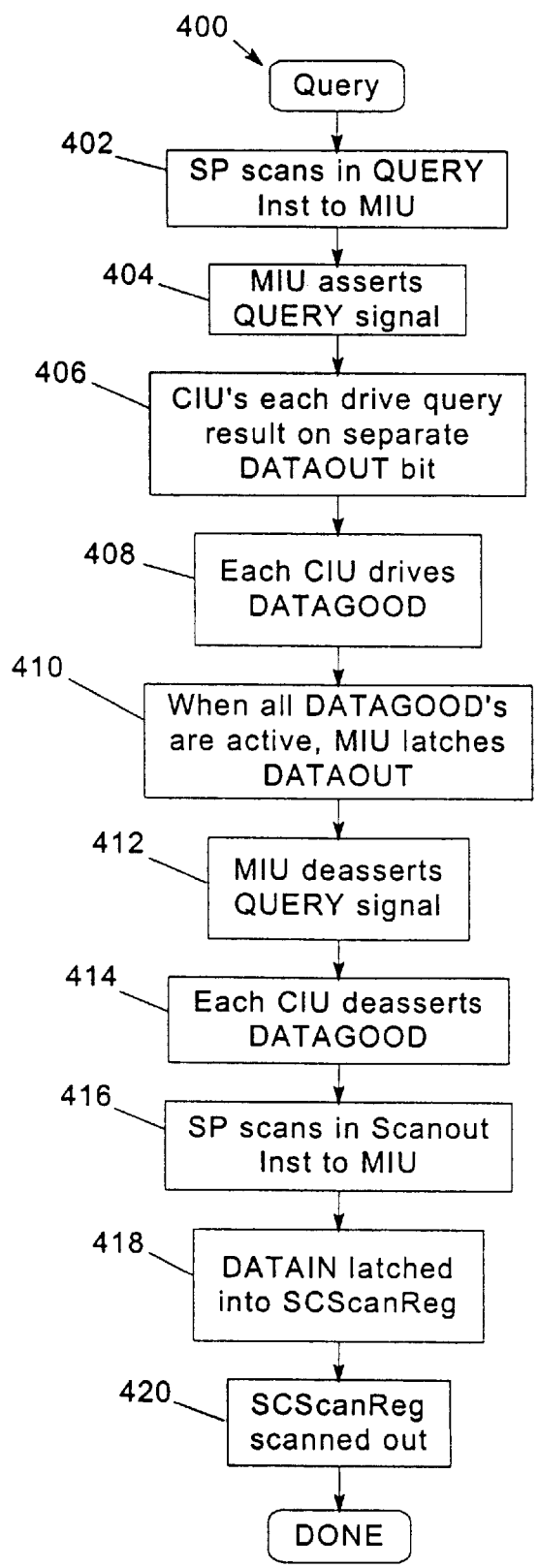
FIG. 14 is a flowchart illustrating the program flow of a query operation performed by the core service interface of FIG. 7.

For example, a QUERY operation consistent with the invention is illustrated at 400 in FIG. 14. The QUERY operation begins in block 402 with the service processor scanning in a "QUERY" instruction to a MIU via the JTAG interface. Within this instruction is a type identifier that indicates the precise type of query that is being requested. Via this protocol, a number of location, identification and status information may be retrieved from all of the core interface units on the CSI bus.

Next, in block 404, the MIU asserts the appropriate QUERY signal to each of the CIU's. In the alternative, as discussed above, this process may be handled via a broadcast command issued to each of the CIU's over the CSI bus.

Next, in block 406, each of the CIU's drive the respective QUERY result on their dedicated line in the DATAIN bus. Moreover, in block 408, each CIU drives its associated DATAGOOD output when the status information has been placed on the DATAIN bus. In this case, the DATAGOOD outputs are logically-AND'ed together via an AND-gate coupled to each of the DATAGOOD lines.

When all of the DATAGOOD signals are received by the MIU, the MIU deasserts the QUERY signal in block 412, resulting in each CIU deasserting its DATAGOOD line in block 414. Next, the service processor scans in a scanout instruction to the Instruction Register (IR) of the MIU in block 416, resulting in the DATAOUT information stored in the MIU being latched into scan register 126 in block 418. Next, in block 420, the scan register is scanned out to the JTAG bus, thereby completing the QUERY operation.

It should be appreciated that with the QUERY protocol described herein, a wide variety of status, location and identification information may be provided in a convenient and efficient manner, as well as for use by a master interface unit as well as other devices external to the integrated circuit.

Master Interface Unit

Figure 15:
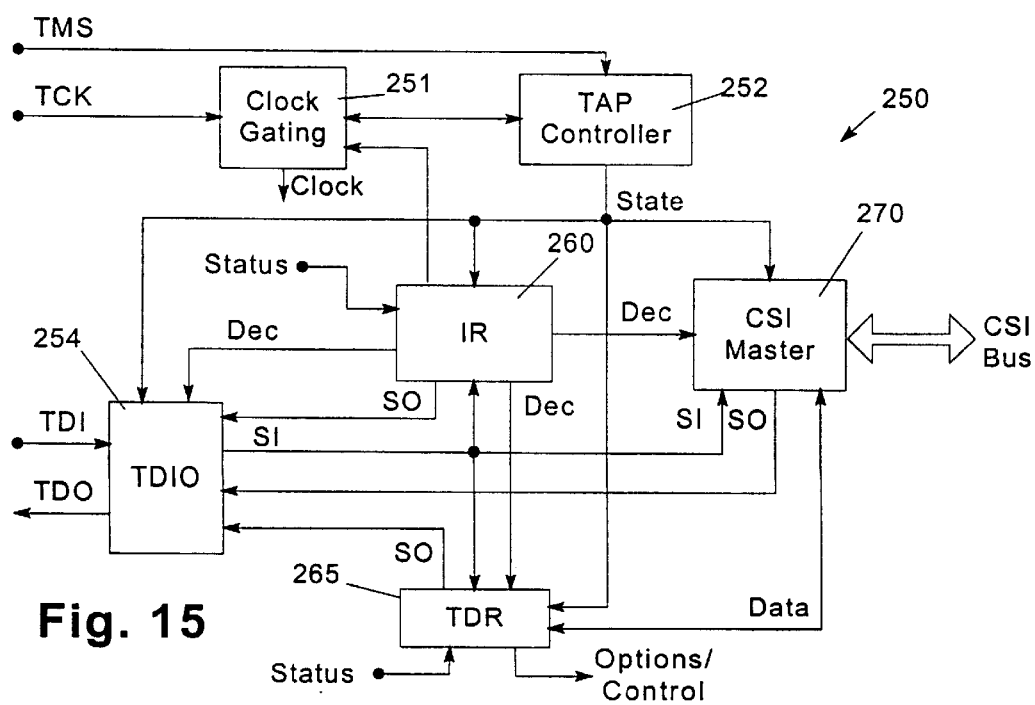
FIG. 15 is a block diagram of another representation of the MIU of FIG. 7.

FIG. 15 illustrates one suitable configuration for a master interface unit 250 consistent with the invention. In addition to operating as the bus master for the CSI bus, MIU 250 also functions to handle the interface with a service bus such as a JTAG-compatible bus, as well as passing information between the service bus and the CSI bus. It should be appreciated that MIU 250 in this implementation does not implement the merged system and service buses as described above with respect to MIU 110, although this feature may be implemented on MIU 250 in the same manner as described above.

A JTAG interface includes four signals, Test Mode Select (TMS), Test Clock (TCK), Test Data In (TDI) and Test Data Out (TDO), as is well known in the art. The TMS signal is processed by a Test Access Port (TAP) controller 252, and the TCK signal is received by clock gating circuitry 251. TAP controller 252 includes a sequencer that handles the interface with a JTAG bus through the test access port, a process that is well known in the art, e.g., as described in the IEEE 1149.1 specification.

Controller 252 relies on several components, including clock gating circuitry 251, a Test Data Input/Output selector (TDIO) 254, an Instruction Register (IR) 260, and a set of Test Data Registers (TDR's), e.g., TDR 265, to interface with the JTAG bus, as well as with the CSI bus via CSI master 270. Clock gating circuitry 251 is controlled by controller 252 and the active instruction in IR 260 to control the supply of clock signals from the TCK signal to the various components in MIU 250.

TDIO 254 is used to route scan data between the JTAG bus and the CSI bus, among other destinations unrelated to the invention. Specifically, scan in (SI) and scan out (SO) paths are defined between selector 254 and each of IR 260, TDR 265 and CSI master 270, so that external data may be scanned into the integrated circuit from the JTAG TDI signal and internal data may be scanned out of the integrated circuit to the JTAG TDO signal.

IR 260 provides decode signals to each of TDIO 254, TDR 265 and CSI Master 270 in response to instructions provided by controller 252 so that predefined actions may be preformed in response to the instructions. The majority of the instructions processed by IR 260 are defined by the JTAG standard. However, to implement an interface with the CSI bus, it may also be desirable to extend the JTAG instruction set to include four new instructions, a CSI read, a CSI write, a CSI query and a CSI reset. The CSI read operation is used to latch desired data into an SCScanReg register (e.g., register 126), so that a subsequent conventional JTAG scan out operation may be performed to retrieve the data (e.g., as discussed above with respect to FIG. 11). The CSI write operation is used to write data that has been previously latched into the SCScanReg register (e.g., by a previous conventional JTAG scan in operation) into an addressed register on the CSI bus. The CSI query may be a subset of the CSI read operation, in that it latches desired data into an SCScanReg register for a JTAG scan out, though the actual CSI operation may be a global read, or just a new signal (e.g., EXIST). The CSI reset operation may be used to reset all of the sequencers, e.g., those discussed below, in communication with the MIU over the CSI bus to idle states. The CSI read, write, query and reset commands may have various suitable opcodes for use in a JTAG command set other than those reserved in the standard (e.g., opcodes 0x17, 0x18, 0x19 and 0x1B, respectively). Moreover, the SCScanReg register may have various suitable offsets for use as the modifier for an instruction register modifier (e.g., 0x000040). It may also be desirable to permit external access to a status register in CSI master 270 (e.g., at offset 0x000080). The status register may contain information such as error and timeout information should a read or write operation on the CSI bus fail or time out (e.g., if the DATAGOOD signal is not received or dropped within a predetermined time frame). For example, one suitable configuration for the CSI master status register is set forth below in Table II:

TABLE II

CSI Master Status Register

| Bit | Description |
|---|---|
| 0 | SCDATAGD never received during read sequence (time-out) |
| 1 | SCdatagd never dropped during read sequence (time-out) |
| 2 | SCdatagd never received during write sequence (time-out) |
| 3 | SCdatagd never dropped during write sequence (time-out) |
| 4:31 | Undefined. |

It should be appreciated that other assignments may be used in the alternative.

IR 260 receives status information, e.g., from a status register. For example, one suitable bit assignment for such a status register is set forth below in Table III:

TABLE III

IR Status Register

| Bit | Description |
|---|---|
| 0 | Attention Active. |
| 1 | Machine Check. |
| 2 | Special Attention. |
| 3 | Recoverable Error. |
| 4 | CSI Attention. |
| 5 | CRC Miscompare on previous data scan-in. |
| 6 | Invalid Instruction, or Unsupported Modifier, or Modifier Parity error on previous IR-scan. |

TABLE III-continued

IR Status Register

| Bit | Description |
|---|---|
| 7 | PGOOD indicator. '1' for first instruction shift following PGOOD active, '0' thereafter. |
| 8:11 | Instruction Count Bit 0:3. |
| 12 | Data Scan Occurred After Last Instruction Scan. |
| 13 | LBIST In Progress or POR Bist in progress. |
| 14 | ABIST In Progress or POR Bist in progress. |
| 15:19 | Ones Counter Bits 0:4. |
| 20:23 | Clock Stuck Bits 0:3. |
| 24:27 | Clock State Bits 0:3. |
| 28:31 | '0001' |

TDR 265 handles many of the scan operations to internal registers within an integrated circuit device with the exception of those through which CSI master 270 handles the interface. TDR 265 may receive status information, and may output control and/or options information. While much of this information is beyond the scope of this invention, it is contemplated that, for example, error blocking signals for the core service interface may be output by TDR 265 in some applications.

It should be appreciated that the functions of components 251, 252, 254, 260 and 265 are principally dictated by the JTAG standard, and the implementation of such components is well known in the art. It should also be appreciated that other implementations may be utilized to integrate a core service interface with other service access ports and protocols consistent with the invention.

CSI master 270 handles information exchange between the JTAG components of MIU 250 and the CSI bus itself As discussed above, the CSI bus utilizes base addresses for each CIU connected to the bus. For uniformity concerns, for example, it may be desirable to utilize the following conventions, set forth below in Table IV, for assigning addresses to CIU's on the bus, and where "core" is a unique four-bit identifier assigned to each core:

TABLE IV

CSI Base Address Map

| BaseSCaddr(0:6) | CSI Attached Partition |
|---|---|
| 0coreXX | Internal Registers: single-core IC's use modifier bits 1:22 to address up to 4M registers; multiple-core IC's use bits 5:22 to address up to 256K registers/core. |
| 0111100 | Chip/Technology-specific Control/Observation Register |
| 1core00 | Clock Interface CIU Registers: single-core IC's use core = '0000' |
| 1core01 | ABIST CIU Registers |
| 1core10 | LBIST CIU Registers |

CSI master 270 operates generally in the manner described above with respect to FIG. 13.
Other base address and bit assignments may be used in the alternative.

Logic Built-In Self-Test Controller

FIG. 16 illustrates one suitable configuration of LBIST CIU 140 consistent with the invention. Within CIU 140 are included a pair of sequencers, CSI read/write sequencer 142 and LBIST control sequencer 144. Each sequencer provides a plurality of SELECT signals to a multiplexer control block 146 that routes such signals to appropriate multiplexers 160, 162, 164, 166, 168 and 169 that provide multiple data path access to a plurality of registers 150, 152, 154, 156, 158 and 159 in the CIU. Each of the registers, as well as LBIST control sequencer 144, outputs to a multiplexer 148 having an output coupled to the DATAIN lines of the CSI bus.

Interface with the core logic is provided by a number of CHANNELS OUT lines which are output by pseudorandom pattern generator (PRPG) register 150 and which are received via CHANNELS IN lines that are supplied to multiple input shift register (MISR) 159 through multiplexer 169. It should be appreciated that the implementation of logic built-in self-testing via PRPG register 150 and MISR register 159 is well-known in the art, and thus, need not be discussed in greater detail herein.

CIS read/write sequencer 142 is coupled to receive the READ, WRITE and ADDR lines from the CSI bus, as well as to output the DATAGOOD signal to an OR gate 149 that outputs the DATAGOOD line to the CSI bus. Sequencer 142 is configured to select various data paths into registers 150–159 through block 146. In addition, a data path from sequencer 142 to a status register 152 is also provided.

Figure 17:
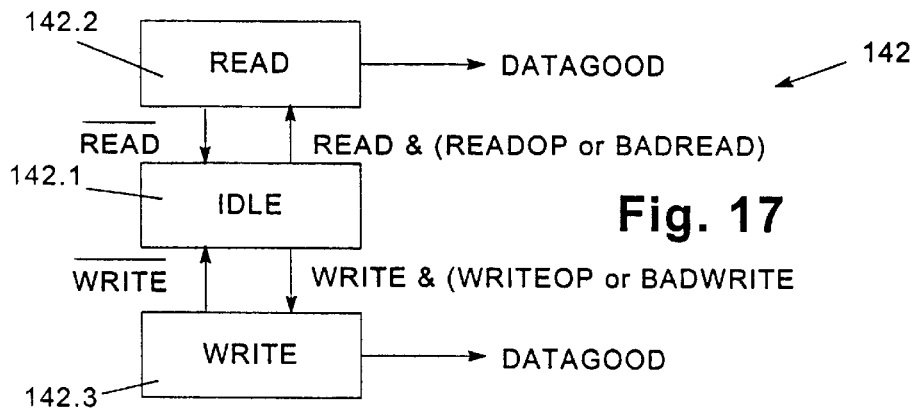
FIG. 17 is a state diagram illustrating the operation of the CSI read/write sequencer of FIG. 16.

FIG. 17 illustrates a state diagram for sequencer 142, including an IDLE state 142.1, a READ state 142.2 and a WRITE state 142.3. With this sequencer, read operations are valid anytime while testing is running, and write operations, even when invalid, are required to be completed on the bus. Sequencer 142 normally remains in IDLE state 142.1. In response to a READ request, which is asserted via the READ line on the CSI bus and the ADDR matching this CIU base address, the sequencer transitions to READ state 142.2. As indicated by the mask "READOP" or "BADREAD", all read operations within the base address range, including all BADREAD operations, result in a state transition. A BADREAD operation is typically a read operation to an invalid address within the base address range.

In response to the transition to state 142.2, multiplexer 148, is configured to output the desired data onto the DATAIN bus. In addition, the DATAGOOD line is asserted to indicate that the data is available on the CSI bus. When the READ line is deasserted, a state transition occurs back to the IDLE state, and the DATAGOOD line is dropped.

For a WRITE operation, if the WRITE line is asserted with an address on the ADDR lines indicating a WRITE operation within the base address range including a BADWRITE operation, a state transition occurs from state 142.1 to state 142.3. A BADWRITE operation is typically an operation that is within the base address range, but not defined, or a write that is requested while testing is in progress. In response to a transition to state 142.3, appropriate multiplexer SELECT signals are output from sequencer 142 to configure multiplexers 160–169 to latch the data on the DATAOUT line on the CSI bus to the appropriate register. In addition, the DATAGOOD line is asserted to indicate that the WRITE operation has been performed. Then, in response to the WRITE line being dropped, a state transition occurs back to IDLE state 142.1, whereby the DATAGOOD line is dropped, and the WRITE operation is complete.

Returning to FIG. 16, LBIST control sequencer 144 receives a number of signals from the CSI bus, including the ADDR lines, the DATAOUT lines, the WRITE line and the IDLE line. Moreover, as discussed above with respect to FIG. 7, sequencer 144 also receives a RUNTEST1 signal and a MODE signal, and outputs a RUNTEST2 signal and BLOCKRESET signal. Sequencer 144 also receives the output of options register 154. Moreover, sequencer 144 outputs a DATAGOOD signal to the CSI bus, as well as various status signals to status register 152. Moreover, sequencer 144 may write to the DATAIN lines of the CSI bus through multiplexer 148.

Figure 18:
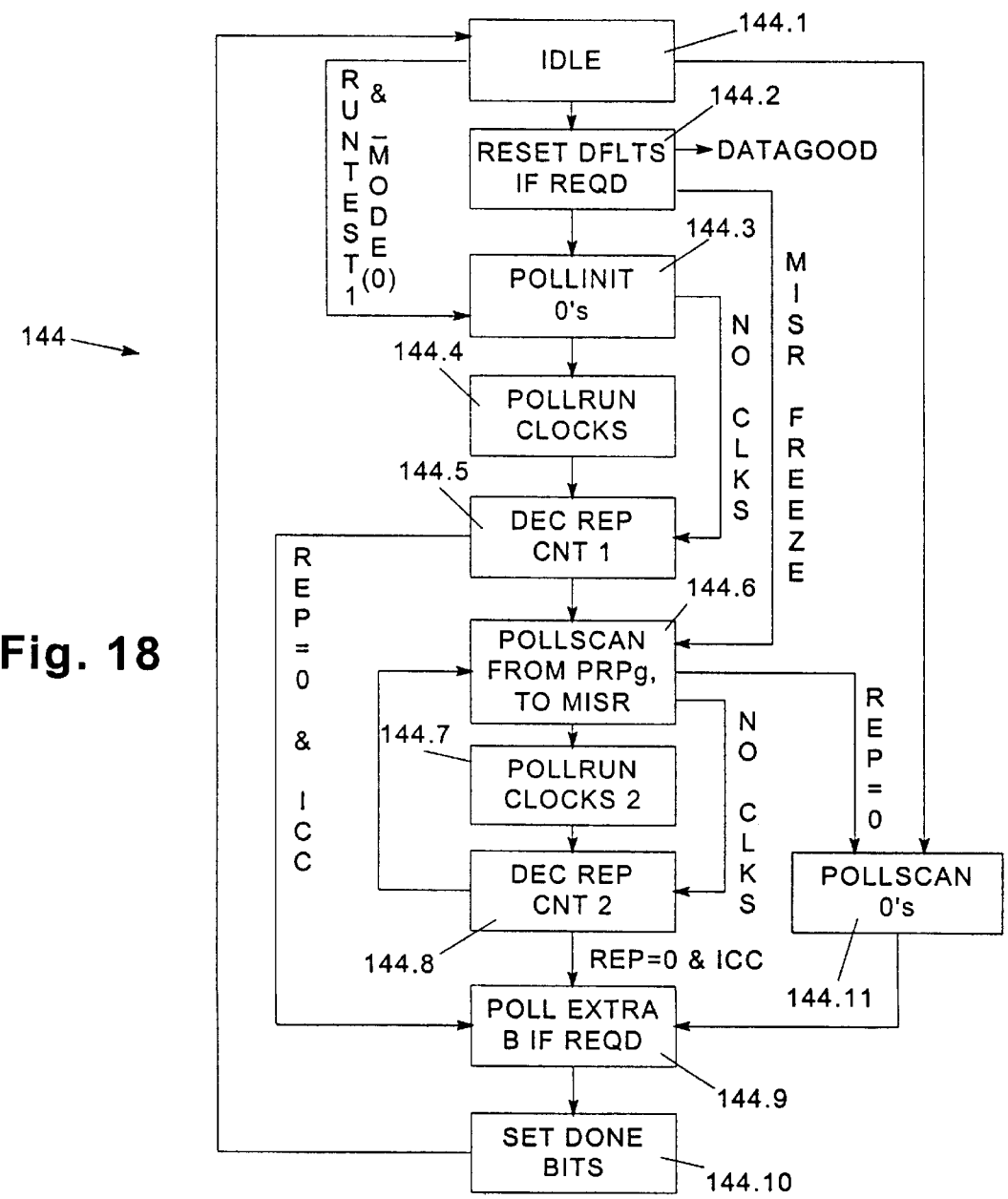
FIG. 18 is a state diagram illustrating the operation of the LBIST control sequencer of FIG. 16.

As shown in FIG. 18, sequencer 144 handles running testing via a JTAG-initiated command, STARTLBIST, or from the RUNTEST1 signal. If initiated from the RUNTEST1 signal, defaults for all registers are used. From a JTAG command, the defaults or previously loaded values may be used.

Under normal sequencing, sequencer 144 begins in an IDLE state 144.1 until a STARTLBIST or RUNTEST1 kicks off the test. State 144.2 is entered only for a STARTLBIST operation, and operates to reset the registers to default values if noted in the STARTLBIST command, discussed below. This state also asserts the DATAGOOD signal indicating that the command has been received.

State 144.3, which is entered for both RUNTEST1 and STARTLBIST, operates to call a poll sequencer, discussed below with reference to FIG. 19, to scan initialize the integrated circuit with all zeros—and clear the registers in the integrated circuit.

Next, a state transition occurs to 144.4, which uses the poll sequencer to run the system clocks based upon the settings in options register 154. A state transition then occurs to state 144.5 where the register 156, a test length register, is decremented. Next, a state transition occurs to state 144.6 where the poll sequencer is utilized to perform a data compression and next test cycle initialization. If this is the last scan, where register 156 is zero (indicated by "REP=0"), a state transition occurs to state 144.11.

Otherwise, a state transition occurs to state 144.7 to use the poll sequencer to run the system clocks based upon the options specified in register 154. Next, the test length register is again decremented via a state transition to state 144.8. The normal loop is then back to state 144.6 to scan another sequence from PRPG register 150 to MISR register 159.

State 144.11, which is entered after the test length register has been decremented to zero, calls the poll sequencer to scan zeros into PRPG register 150 and thereby clear the test data from the integrated circuit.

Next, a state transition occurs to 144.9 to use the poll sequencer to move PRPG and MISR master data to slave if required based upon the options register in the system clock configurations. Next, a state transition occurs to state 144.10 to load status register 152 with the test results. Upon completion of state 144.10, the test sequence is complete and a state transition occurs back to state 144.1.

Several additional debug legs are also provided between the various states. A "MISR FREEZE" leg passes from state 144.2 to state 144.6 to allow the PRPG to initialize the channels rather than starting with all zeros, as well as to signal the need to hold the MISR register for the first test cycle. The "NO CLKS" from state 144.3 to state 144.5, and from state 144.6 to state 144.8, respectively by-pass states 144.4 and 144.7 when this function is selected in the options register. In addition, the "REP=0 & ICC" legs from state 144.8 to state 144.9 and from state 144.5 to state 144.9 by-pass the final clearing of the channels to allow debug of the uncompressed data. State 144.9 will also move the master data to the slaves within the chip integrated circuit channel if selected in the options register.

Figure 19:
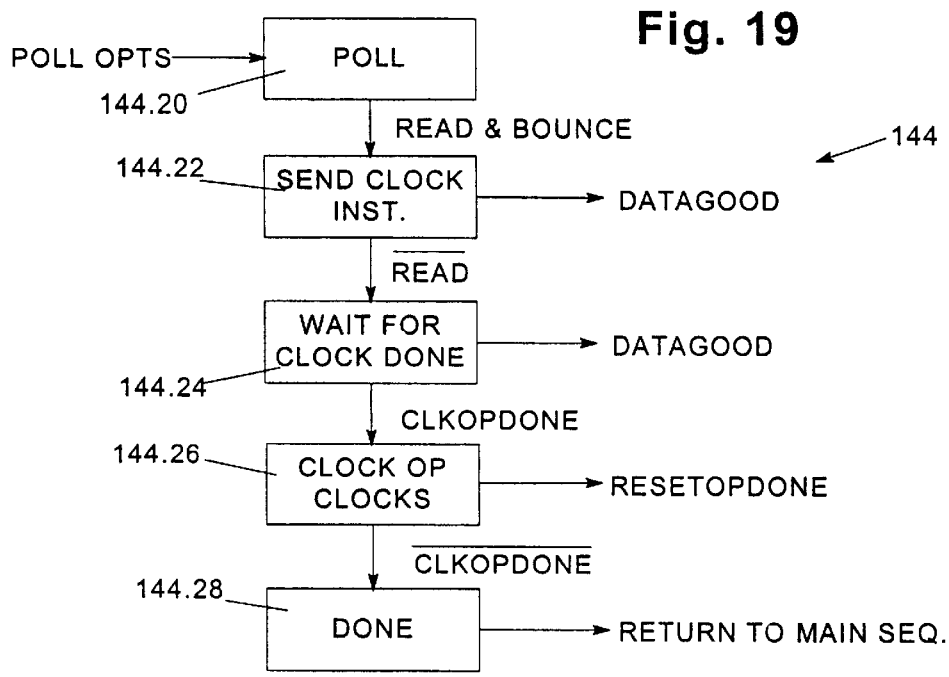
FIG. 19 is a state diagram illustrating the operation of a poll sequencer in the LBIST control sequencer of FIG. 16.

Control sequencer 144 also includes a poll sequencer, illustrated by states 144.20–144.28 in FIG. 19. The poll sequencer handles sending BOUNCE commands on the core service interface to perform various clock operations with the clock interface CIU 200. The commands bounced to the clock interface CIU change for each call to the sequence; however, the sequence of events is the same. Specifically, state 144.20 is entered whenever the LBIST enters any of states 144.3, 144.4, 144.6, 144.7, 144.9 and 144.11. The LBIST sequencer then remains in its state until the poll sequencer completes. In response to a state transition to state 144.20, the core service interface is polled by the sequencer.

State 144.2 then handles the read operation for the poll requested on the core service interface, outputting the DATAGOOD line. Once the read operation is complete, a state transition occurs to state 144.24 to wait for a CLKOPDONE signal from the clock interface. While this is shown as a single state for a signal from the clock interface, it should be appreciated that this state is typically implemented via another BOUNCE operation on the core service interface. Once the clock is complete, a state transition occurs to state 144.26 to allow a handshake back to the clock interface. It should be appreciated, however, that if the BOUNCE operation is used, this state would typically not be required. State 144.28 then completes the handshake and signals the LBIST sequencer to continue.

One suitable format for the clock command issued by the LBIST CIU 140 to CIU 200 is illustrated below in Table V:

TABLE V

LBIST Clock Command Format

| Bits | Description |
|---|---|
| 0:6 | Clock Interface Base Address (to bounce to) |
| 7 | Not Used. |
| 8:9 | Command Source '10' for all LBIST operations. |
| 10 | LBIST Operation Select. '0' = Pulse Functional Clocks. '1' = Run Scan Clocks. |
| 11–13 | Clock Command. '001' = Pulse Selected Clocks (no sync). |
| 14–15 | Clock Mode. |
| 16 | No ABIST engine clocks during LBIST. |
| 17 | Add ABIST arrays clocks to LBIST. |
| 18:23 | Clock Domain Select |
| 24 | No extra A after scan. |
| 25 | No extra B before scan. |
| 26 | No offset scan speed skew. |
| 27:42 | Scan Clock Count. |
| 43:44 | Expansion Clock Mode Bits |
| 45:63 | Not used. |

Returning to FIG. 16, each of registers 150–159 is discussed in greater detail. Each register 150 is configured as a 64-bit register, with the $64^{th}$ bit used to indicate a read error.

Each register is proceeded by a corresponding multiplexer having at least two inputs. A first input is the DATAOUT lines from the CSI bus, which permits each register to be written to as necessary over the bus. Each register also has associated therewith a default value—indicated by the letter "C" in a circle—that provides initial conditions that may be loaded into the register upon startup. Each register has a unique offset address from the base address of the CIU to permit the register to be directly read or written via the CSI bus. Table VI below illustrates suitable offset values for each of registers 150–159.

TABLE VI

LBIST Register Address Offsets

| Offset | Commands | Register |
|---|---|---|
| 0x002 | R/W | Options Reg. |
| 004 | R/W | MISR |
| 007 | R/W | PRPG |
| 008 | R/W | Channel Length |
| 00B | R/W | Test Length |
| 00D | R/W | Status Reg. |
| 00E | W | STARTLBIST |

Each of the registers may be written to or read from by performing a read or write operation using the base address of the CIU summed with the offset for the register. In addition, a STARTLBIST command may be initiated via a write to offset "00E". Within this command, the modifier provided therewith over the DATAOUT lines may also be used to control whether each register should be reset prior to running LBIST. For example, it may be desirable to map bits 0–4 respectively to options register 154, MISR 159, PRPG 150, channel length 158 and test length 156 such that a one in any of these bits uses the current contents of the corresponding register, whereas a zero in any of these bits resets the register with the default value specified therefor. Other information may be provided in a STARTLBIST command consistent with the invention.

PRPG 150 and MISR 159 are used to handle the supply of patterns to the core logic in a manner known in the art. To this extent, PRPG 150 outputs the CHANNELS OUT data, while MISR 159 has an additional input to the multiplexer 169 therefor which receives the CHANNEL IN data.

Test length register 156 is used to store a test length, representative of the number of test patterns to run on the core logic during LBIST. To this extent, test length register 156 receives a decrement command from sequencer 144 for each LBIST cycle such that the register maintains an indication of the number of cycles left in the test. Channel length register 158 contains a channel length used for LBIST commands, and is part of the clock command bounced to the clock interface CIU when a scan is required during LBIST.

Options register 154 is utilized to configure various operational parameters that are used during LBIST. One suitable configuration for options register 154 is illustrated below in Table VII:

TABLE VII

Options Register

| Bit | Description |
|---|---|
| 0:3 | Clock Mode |
| 4 | No Extra A Clock |
| 5 | No Extra B Clock |
| 6:8 | Region Select |
| 9:15 | Channel Select |
| 16 | Selected Channel: Selects a channel to gate to MISR and TDO if scanning, based on bits 9:15 |
| 17 | Deselected Channel: Blocks a single channel to the MISR based on bits 9:15. If set with Selected Channel, will block all channels to MISR. |
| 18 | Inhibit Channel Clearing: Stops LBIST with the channel values intact for the cycle count selected. |
| 19 | No Final Extra B Clock |
| 20 | No ABIST Logic: Blocks the clocks to ABIST engines that were included in LBIST. |
| 21 | Add Arrays: Adds arrays to the LBIST results. |
| 22 | Continual LBIST: Set to run LBIST continually. |
| 23 | MISR Clear: Used to hold the MISR for the first cycle (MISR FREEZE) when restarting LBIST after a failing cycle. |
| 24 | Alternate PRPG: Select alternate PRPG feedback. |
| 25 | View Loaded Lengths: When reset, reads of the CHANNEL LENGTH and TEST LENGTH will be the default values. This bit can be set to allow reading the loaded values. |
| 26 | No Offset Scan: Turns off offset scan power saving option. |
| 27 | Enable MISR Overflow: When set, gates the last bit of the MISR to the TDO output and the A clock to the ATTENTION output of the chip during LBIST scanning. |
| 28:29 | Scan Speed: Used to run the scans slower during LBIST for lower power and noise. |
| 30:62 | Not Used. |

Status register 152 is utilized to provide status information regarding the results of the LBIST operation performed by CIU 140. One suitable configuration for this register is illustrated below in Table VIII:

TABLE VIII

Status Register

| Bit | Description |
|---|---|
| 0 | LBIST In Progress: Set when LBIST is running, reset when complete. |
| 1 | LBIST Complete: Set when LBIST results have been loaded for either POR or JTAG initiated tests. Reset at the start of LBIST. |
| 2 | LBIST Invalid Write Error. |
| 3 | LBIST Invalid Read Error. |
| 4 | Not Used. |
| 5:15 | LBIST Sequencer State. |
| 16:20 | LBIST Poll Sequencer State. |
| 21:62 | Not Used. |

Array Built-In Self-Test Controller

Figure 20:
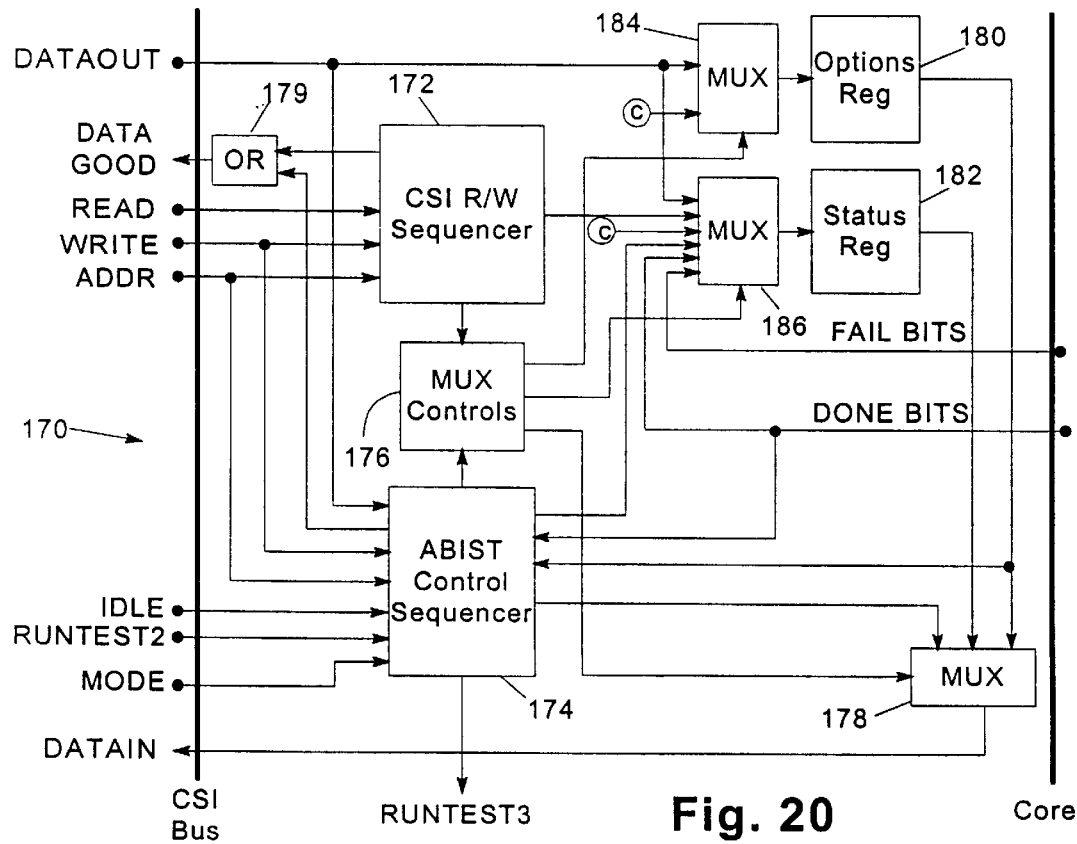
FIG. 20 is a block diagram of the ABIST core interface unit of FIG. 7.

An array built-in self-test (ABIST) core interface unit is illustrated in greater detail at 170 in FIG. 20. CIU 170 is similar in many respects to LBIST CIU 140 described above with reference to FIG. 16. Specifically, CIU 170 includes a CSI read/write sequencer 172 and an ABIST control sequencer 174 that, through a multiplexer control block 176, supply SELECT signals to a DATAIN multiplexer 178 and a pair of additional multiplexers 194, 196 that control the data input to a pair of registers, options register 180 and status register 182.

CSI read/write sequencer 172 receives the READ, WRITE and ADDR lines from CSI bus, and outputs the DATAGOOD line through an OR gate 179. Sequencer 172 also outputs status information to status register 182 through a data path into multiplexer 186.

Sequencer 172 operates in essentially the same manner as sequencer 142 of CIU 140, as is shown in FIG. 17 and discussed above in the accompanying text therefor. The only possible modification to this sequencer design is the type of "BAD" operation that may be indicated by the CIU. Specifically, a BAD operation may be defined if a START-ABIST request is received while LBIST is running. Otherwise, the basic sequence of READ and WRITE operations is essentially the same. It may also be desirable to handle the write operation to the options register in ABIST control sequencer 174 so that ABIST may be started as well as loading the register.

ABIST control sequencer 174 receives as input the WRITE, ADDR, DATAOUT and IDLE signals from the CSI bus, and outputs a DATAGOOD signal to the bus through OR gate 179. In addition, as discussed above with respect to the automated test sequence described with reference to FIG. 7, sequencer 174 may also receive RUNTEST2 and MODE signals and output a RUNTEST3 signal. Sequencer 174 is also configured to receive the contents of the options register, and to output data to multiplexer 178, as well as status signals to status register 182 through multiplexer 186.

Table IX below illustrates one suitable base offset assignment for the options and status registers 180, 182 in CIU 170:

TABLE IX

ABIST Register Address Offsets

| Offset | Commands | Register |
|---|---|---|
| 002 | R/W | Options Reg. |
| 004 or 007 | R/W | Status Reg. |

Either register may be read from or written to through a read or write appropriate command. Moreover, it may be desirable to configure sequencer 174 to run ABIST in response to a write to the options register, although a separate base address offset may also be used to initiate an ABIST operation.

The options register 180 is configured to receive either the DATAOUT lines from the bus or a default value. One suitable bit assignment for the register is illustrated below in Table X:

TABLE X

Options Register

| Bit | Description |
|---|---|
| 0 | ABIST Speed: Set to '1' for slow, default is fast. |
| 1:7 | ABIST Done Mask: Set to '1' to block corresponding DONE signal. |
| 8:62 | Not Used. |

Status register 182 also is configured to receive the DATAOUT lines of the CSI bus and a default value, but is also configured to receive a data path from sequencer 172, status signals from sequencer 174, and a set of FAIL bits and DONE bits from the ABIST engines disposed in the core. One suitable bit assignment of status register 182 is illustrated below in Table XI:

TABLE XI

Status Register

| Bit | Description |
|---|---|
| 0 | ABIST In Progress: Set when ABIST is running, reset when complete. |
| 1 | ABIST Complete: Set when ABIST results have been loaded for either POR or JTAG initiated tests. Reset at the start of ABIST. |
| 2 | ABIST Invalid Write Error. |
| 3 | ABIST Invalid Read Error. |
| 4:7 | Not Used. |
| 8:15 | ABIST Sequencer State. |
| 16 | Not Used. |
| 17:23 | ABIST Done: Set when corresponding DONE signal is set, the DONE MASK bit is not set, and the sequencer expects ABIST to have run |
| 24:47 | ABIST Pass: Set when corresponding ABPASS bit is set and the sequencer expects ABIST to have run. |
| 48:62 | Not Used. |

Figure 21:
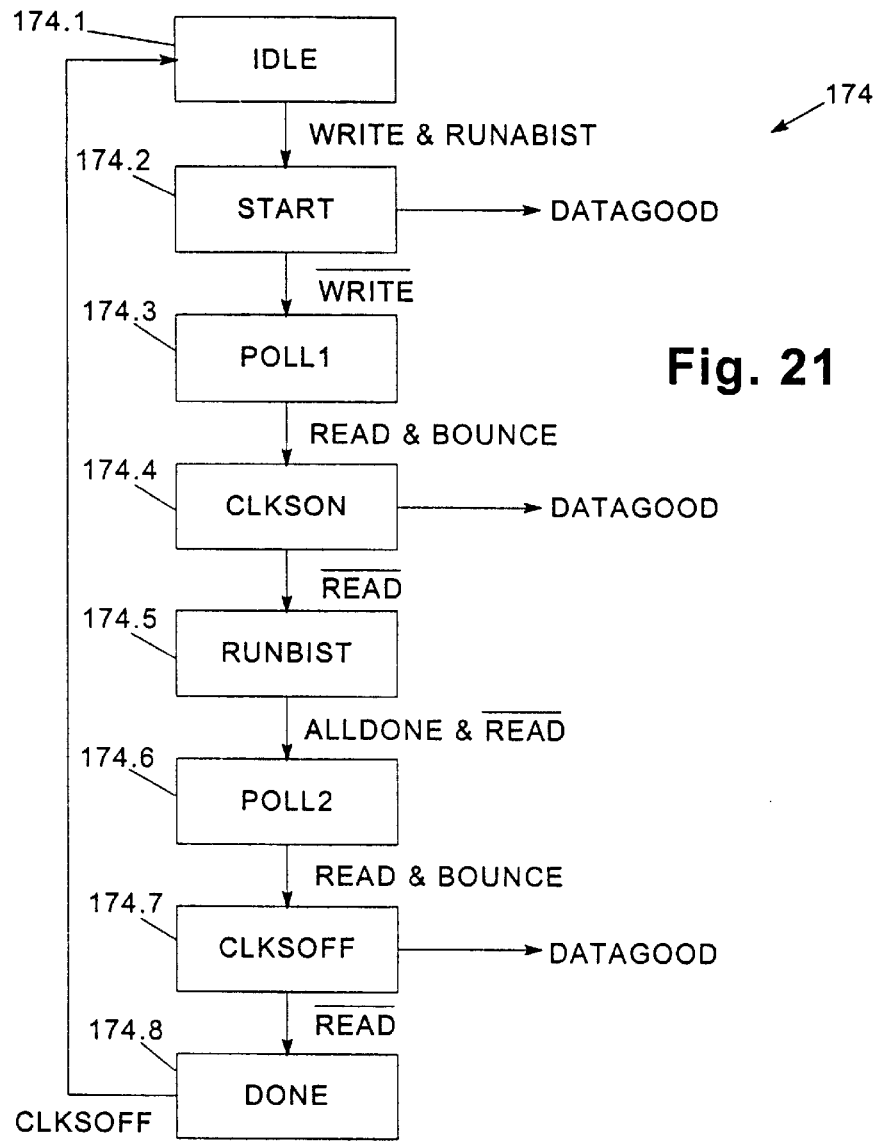
FIG. 21 is a state diagram illustrating the operation of the ABIST control sequencer of FIG. 20.

ABIST sequencer 174, which is illustrated in greater detail in FIG. 21, handles running ABIST from a JTAG-initiated CSI command. Sequencer 174 starts in state 174.1. States 174.1, 174.2 and 174.3 represent the handling of a standard CSI write operation to the options register that kicks off the test. State 174.3 requests a BOUNCE sequence on the CSI bus to turn on the ABIST clocks using CIU 200, which is handled by states 174.3, 174.4 and 174.5. Once the clocks are started by CIU 200, with ABIST enabled, the clock interface CIU supplies the control signals directly to the ABIST engines to start ABIST automatically, which proceeds until DONE signals are received from each of the ABIST engines coupled to CIU 170. In the alternative, ABIST CIU may be configured to start the ABIST engines in other implementations. Accordingly, once in state 174.5, sequencer 174 waits until all selected arrays are tested—which may be performed, for example, by AND-mg together all of the DONE bits to generate an ALLDONE signal. Alternatively, completion of the test may the output of a timer in the clock interface. In addition, the CSI READ line is monitored to wait until no other read operations are performed on the bus. When this is the case, a state transition to state 174.6 occurs to request another BOUNCE operation to turn off the clock. States 174.6, 174.7 and 174.8, therefore, complete the BOUNCE operation in the manner described above. When it is detected that the clocks have been turned off, state 174.8 transitions back to IDLE state 174.1, whereby the ABIST sequence is complete. Table XII illustrates a suitable CLK command format for the BOUNCE operations described above:

TABLE XII

ABIST Clock Command Format

| Bits | Description |
|---|---|
| 0:6 | Clock Interface Base Address |
| 7 | Not used. |
| 8:9 | Command Source: '01' for all ABIST operations. |
| 10 | ABIST Clock Speed: '0' = Fast, '1' = Slow. |
| 11:13 | Clock Command: '010' = Start Selected Clocks (no sync), '011' = Stop Selected Clocks (no sync). |
| 14:17 | Not Used. |
| 18:23 | Clock Domain Select |
| 24:63 | Not Used. |

It should also be noted that an integrated circuit mus be initialized to allow the ABIST engines to be started, which typically e n tails flushing the chip to all zeros, turning off the clocks and inhibiting chip drivers.

As an alternative to the state sequence in sequencer 174 de scribed in FIG. 21, additional BOUNCE sequences may be utilized to remove many of the non-CSI controls in the sequencer. For example, one additional BOUNCE sequence may signal the ALLDONE signal when a timer from the clock tree expires. This would additionally re quire the original start clock bounce sequence to include the base address of the requesting ABIST CIU, so that the clock interface knows where to respond. A second BOUNCE sequence may also be used to permit the clock interface to respond that the clock stop has completed.

It should be appreciated that, with the addition of an ABIST CIU, the DONE bits received from the core are typically used to time the test, with the FAIL bits stored as results. Also discussed above, with multiple ABIST engines running in parallel, the DONE signals may be ANDed together to form an ALLDONE signal. While it may be desirable for power on testing to test all ABIST engines, it may be possible that arrays may be selectively deallocatable, e.g., during fault tolerance and lab debug testing, whereby ABIST may not be run by all engines coupled to a CIU in some circumstances. When this occurs, the DONE signal for deallocated arrays are never asserted, and thus, the ALLDONE signal is never asserted, and the results not latched from any arrays.

Therefore, to permit arrays to be deallocated without jeopardizing the completion of an ABIST operation, a DONE mask may be used to mask out deallocated ABIST engines from the generation of the ALLDONE signal.

Figure 22:
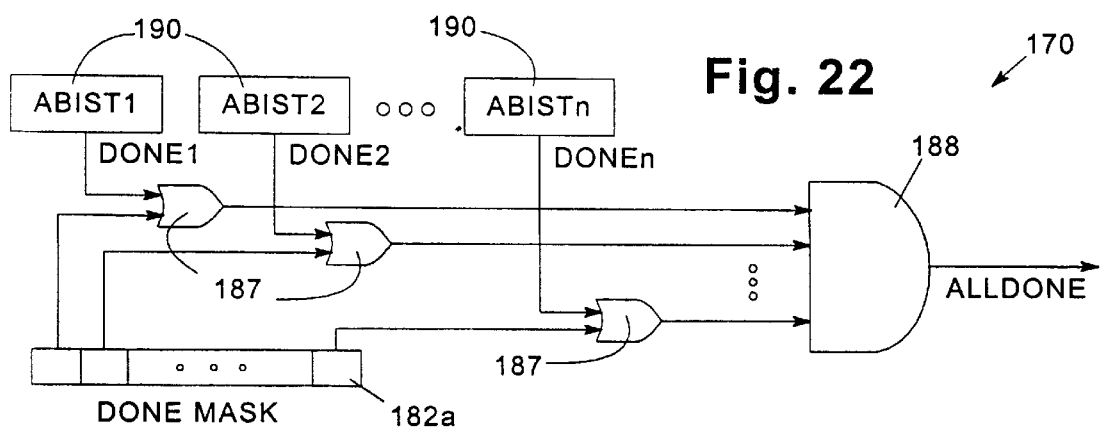
FIG. 22 is a block diagram illustrating a masking arrangement utilized in the ABIST control sequencer of FIG. 20.

As shown in FIG. 22, the DONE mask 182a, which may be stored in options register 180 as described above with respect to Table X, may have a series of bits that are stored using OR gates 187 with the various ABIST engines 190 disposed on an integrated circuit. The output of each OR gate 187 is then fed into an AND gate 188 from which the ALLDONE signal is generated. Accordingly, if a one is asserted in a particular bit in the DONE mask, this bit will be supplied to AND gate 188 and thereby prevent the deallocation of an array assigned to such bit from affecting the state of the ALLDONE signal.

Clock Interface Controller

Figure 23:
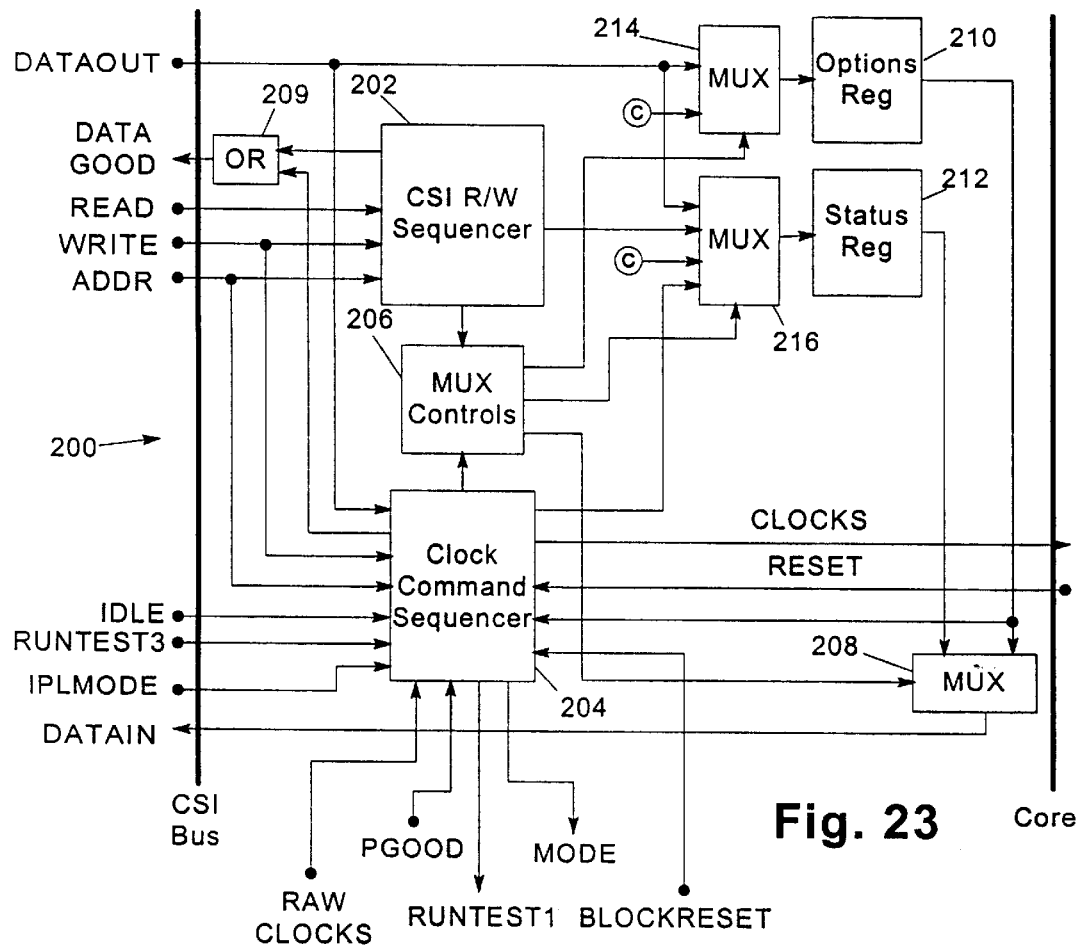
FIG. 23 is a block diagram of the CLKINTF core interface unit of FIG. 7.
Figure 25:
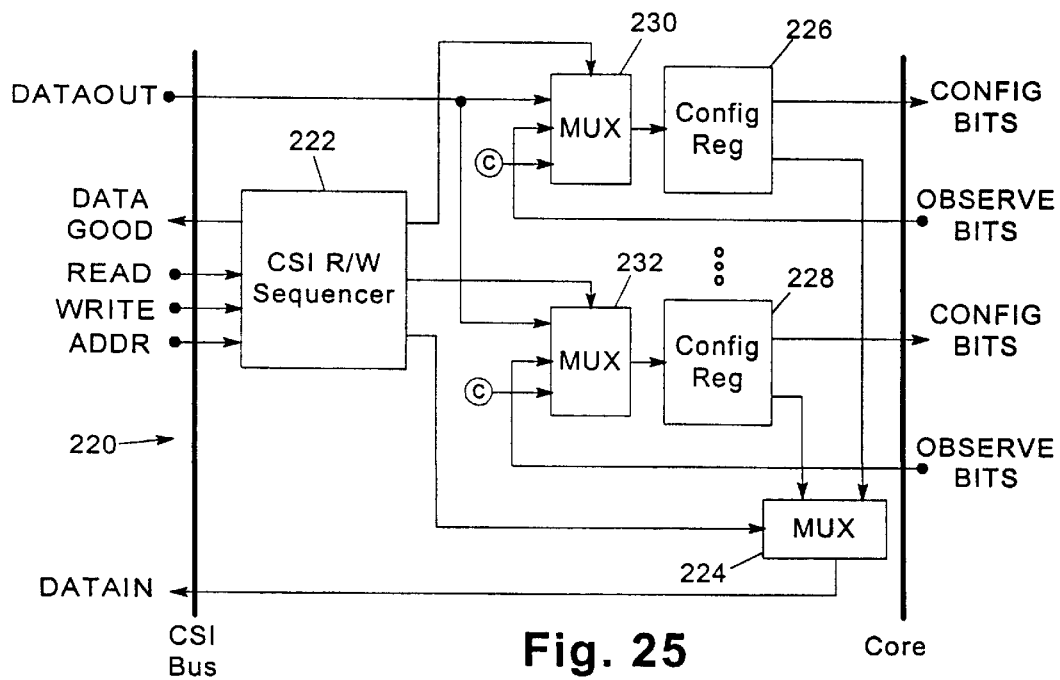
FIG. 25 is a block diagram of a Technofunc core interface unit, e.g., as shown in FIG. 3.

Clock interface CIU 200 is illustrated in greater detail in FIG. 23. The CIU serves a number of functions in an integrated circuit, including that of system clock distribution, built-in self-test clock distribution—typically scan clock distribution at system clock speed—JTAG clock distribution—typically scan clock distribution at a slower JTAG clock speed. Furthermore, the CIU serves as a manner of centralizing POR and software-based RESET sequencing for the various components on the core service interface.

A clock interface core interface unit may operate as a global clock interface that provides clock distribution to multiple cores on an integrated circuit device. A clock interface may also be local to a particular core, and it should be appreciated that multiple clock interface CIU's may be utilized on any given integrated circuit device.

As shown in FIG. 23, CIU 200 is configured in much the same manner as CIU's 140 and 170, including a CSI read/write sequencer 202 and a clock command sequencer 204 that provide SELECT signals to various multiplexers 208, 214 and 216. CSI read/write sequencer 202 operates in a similar manner to the sequencers for each of CIU's 140 and 170, receiving READ, WRITE and ADDR lines from the CSI bus and outputting a DATAGOOD line to the CSI bus through OR gate 209. Clock command sequencer 204 receives the DATAOUT, WRITE, ADDR and IDLE signals from the CSI bus and outputs a DATAGOOD line to OR gate 209. The DATAIN lines of the CSI bus are coupled to the output multiplexer 208. Sequencer 204 also receives several signals related to the automated test sequencing described above with reference to FIG. 7, specifically, the PGOOD, RUNTEST3, IPLMODE and BLOCKRESET signals. Similarly, sequencer 204 also outputs RUNTEST1 and MODE signals as discussed above with reference to FIG. 7.

Sequencer 204 is also responsive to a RESET signal generated within the integrated circuit. Moreover, raw clock signals are received by sequencer and clock signals are in turn output to the clock trees disposed on the various cores within the integrated circuit device, in a manner that is well-known in the art. Sequencer 204 also outputs status signals to multiplexer 216 to store status information within status register 212.

A pair of registers, options register 210 and status register 212, are coupled respectively to multiplexers 214, 216. Multiplexer 214 couples register 210 to either the DATAOUT lines of the CSI bus or a default value. Multiplexer 216 supplies the DATAOUT lines from the CSI bus or a default value to status register 212, as well as an additional data path from sequencer 202 and a DONE signal from sequencer 204.

The registers within CIU 200 may have the following base offsets, as shown in Table XIII:

TABLE XIII

Clock Interface Register Address Offsets

| Offset | Register |
|---|---|
| 0x002 | Command Register |
| 003 | Status Register |
| 005 | Options Register #1 |
| 006 | Options Register #2 |
| 009 | Options Register #3 |
| 00A | Options Register #4 |

The status register may have the bit map shown below in Table XIV, although other bit mappings are also possible consistent with the invention:

TABLE XIV

Status Register

| Bit | Description |
|---|---|
| 0 | Command Collision Error. A clock command was received while the Clock Command Controller was busy processing a previous command. |
| 1 | Invalid Command Source Error. Command Source bits indicate command not from JTAG, ABIST, or LBIST. |
| 2 | Invalid Read/Write Address Error. An attempt was made to read or write to a Clock Interface address that does not exist. |
| 3 | JTAG/POR Test Collision Error. JTAG attempted to initiate a clock command while POR Test was in progress. |
| 4 | JTAG/BIST Collision Error. JTAG attempted to initiate a write to a valid register while LBIST or ABIST was in progress. |
| 5 | ABIST Error. Command Source indicates ABIST, but ABIST not in progress. |
| 6 | LBIST Error. Command Source indicates LBIST, but LBIST not in progress. |
| 7 | Options Register Write Error. A write to Options Register 1, 2, or 3 was made while clocks are on. |
| 8:11 | PLL_LOCK(0:3) State. If '1', PLL unlock detected. |
| 12 | POR Test Complete. |
| 13:15 | Not Used. |
| 16:18 | IPL Mode |
| 19 | Clock Synchronization Signal. |
| 20:63 | Not Used. |

As to options register 210, this register may be implemented by any number of registers, e.g., four separate registers 1–4 that provide 256 bits of information. Options registers 1 and 2, for example, may provide DELAYSELECT bits that indicate delay parameters for a clock tree. Options register 3, for example, may have the following bit mapping, as shown below in Table XV:

TABLE XV

Options Register 3

| Bit | Description |
|---|---|
| 0:31 | Clock Control. |
| 32:35 | Tristate Drivers. |
| 36 | ABIST Characterization Mode. |
| 37 | Wire Test Mode. |
| 38:63 | Not Used. |

The options 4 register may provide blocking signals for the various conditions indicated in status register 212. To this extent, many of these conditions may signal an ATTN to the master interface unit so that the clock interface unit may be polled to determine the result of the error. As a result, the various blocking mechanisms in the options register may be used to inhibit the generation of an ATTN signal. Table XVI below illustrates one suitable mapping for option register 4:

TABLE XVI

Options Register 4

| Bit | Description |
|---|---|
| 0 | Block Command Collision Error. |
| 1 | Block Invalid Command Source Error. |
| 2 | Block Invalid Read/Write Address Error. |
| 3 | Block JTAG/POR Test Collision Error. |
| 4 | Block JTAG/BIST Collision Error. |

TABLE XVI-continued

Options Register 4

| Bit | Description |
|---|---|
| 5 | Block ABIST Error. |
| 6 | Block LBIST Error. |
| 7 | Block Options Register Write Error. |
| 8:11 | Block PLL(0:3) Lock Error. |
| 12 | Block POR Test Complete Attention. |
| 13 | Stop Clocks on Error, STOP_ON_ERR. |
| 14:15 | Not Used. |
| 16:19 | PLL Reset, PLLRST(0:3). |
| 20:63 | Not Used. |

Clock command sequencer 204 includes two separate sequencers. A first sequencer is a power-on reset (POR) sequencer, which implements the automated sequence function described above with respect to FIG. 8. Specifically, the POR sequencer generally transitions from an IDLE state to load the mode bits in the manner described in connection with blocks 302–212 of FIG. 8. Next, the clocks are stopped and the drivers inhibited by setting appropriate latches, and then the automated sequence is initiated by asserting RUNTEST1. The POR sequencer then waits for assertion of RUNTEST3, and when detected, the POR sequencer selectively starts the clocks and enables the drivers based upon the state of MODE bit 2. RUNTEST1 is then deasserted, and upon deassertion of RUNTEST3, the sequencer returns to an IDLE state.

Figure 24:
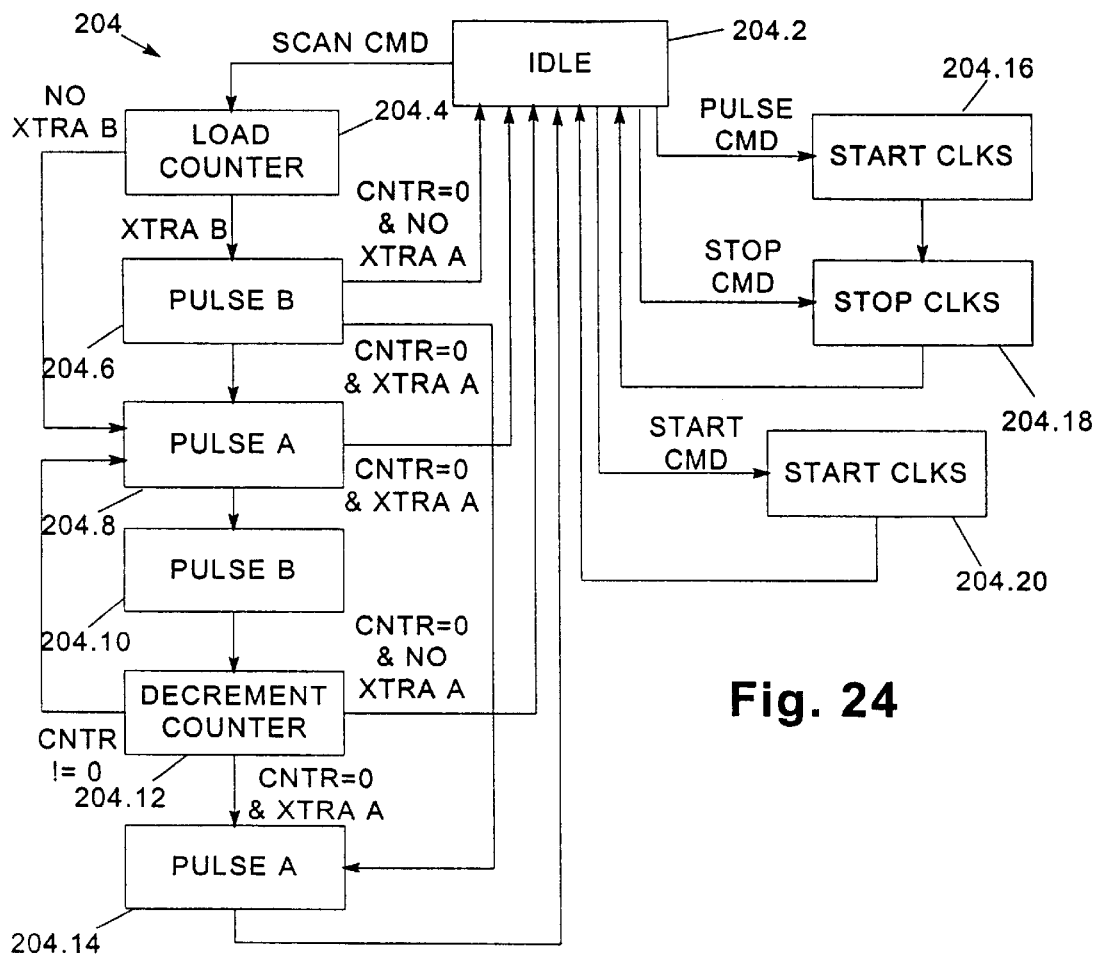
FIG. 24 is a state diagram illustrating the operation of the CLKINTF control sequencer of FIG. 23.

FIG. 24 illustrates a state diagram for a second, clock command sequencer in block 204, which begins in idle state 204.2. Based upon the particular command passed to the sequencer, several different state transitions may occur. For a scan command, typically initiated by a scan command polled from LBIST CIU 140, a state transition occurs to state 204.4, where a counter is loaded with the scan clock count specified in the command. Although other clock arrangements may be used, CIU 200 as described herein interfaces with a master-slave clock arrangement, where the master stage clock is designated the "A" clock and the slave stage clock is designated the "B" clock. Thus, depending upon whether the "no extra B" flag has been set in the clock command, a state transition occurs to either state 204.6 or state 204.8.

If an extra B stage cycle is desired prior to a scan, state 204.6 pulses the B stage clock. Then, if the value stored in the counter is zero, control passes to either of states 204.2 or 204.14 based upon whether the "no extra A" flag has been set in the clock command. If not, a state transition occurs to state 204.14 to pulse the A stage clock. If so, a state transition occurs back to state 204.2, indicating completion of the command.

If the value in the counter is not zero, a state transition occurs from state 204.6 to state 204.8. A transition to this state also occurs from state 204.4 if the "no extra B" flag is set. State 204.8 pulses the A stage clock, and thereafter, if the value in the counter is zero and the "no extra A" flag is not set, a state transition occurs to state 204.2, indicating completion of the command. Otherwise, state 204.8 transitions to state 204.10 to pulse the B stage clock, and then to state 204.12 to decrement the counter.

So long as the value in the counter is not zero, a state transition occurs back to state 204.8 to again sequentially pulse the A and B stage clocks. If, however, the value in the counter is zero, a state transition occurs to state 204.2 if the "no extra A" flag is set, indicating completion of the command. If the "no extra A" flag is not set, a state transition occurs to state 204.14 to pulse the A stage clock and thereafter transition to state 204.2. Handling of the scan command is then complete.

Another command that may be processed by sequencer 204 is a pulse command, which is handled in states 204.16 and 204.18 to sequentially start and stop the clocks in successive cycles. Starting and stopping the clocks typically includes setting an appropriate latch that gates the clocks, in a manner known in the art. A stop command is handled by a state transition directly to state 204.18. A start command is handled by a state transition to state 204.20 that starts the clocks in the same manner as state 204.16.

It should be appreciated that other commands may be supported by sequencer 204 consistent with the invention. For example, in addition to the various commands described above in connection with Tables V and XII, a clock command format for use by a service processor or other external device through the JTAG interface is illustrated below in Table XVII:

TABLE XVII

SP/JTAG Clock Command Format

| Bit | Description |
|---|---|
| 0:7 | Not Used for SP/JTAG. |
| 8:9 | Command Source. '00' = SP/JTAG. |
| 10 | Run PORTEST. |
| 11:13 | Command. '000' = NOOP. |
| | '001' = Pulse Selected Clocks (no sync). |
| | '010' = Start Selected Clocks (no sync). |
| | '011' = Stop Selected Clocks (no sync). |
| | '100' = Follow clk sync for selected clocks. |
| | '101' = Stop CLKSYNC clocks. |
| | '110' = Pulse selected clocks one cycle (use clk sync). |
| | '111' = Not Used. NOOP. |
| 14 | Master Clock Sync Enable. |
| 15 | Master Clock Sync Value. |
| 16 | Error Reset Enable. |
| 17 | Dynamic Clock Speed Enable. |
| 18:23 | Clock Domain Select |
| 24:26 | POR Test Mode. |
| 27:63 | Not Used. |

In general, it should be appreciated that, along with the various LBIST and ABIST operations described above, control of a clock tree within an integrated circuit device by a clock controller is well-known in the art. Moreover, such operations are beyond the scope of this disclosure, and therefore, will not be discussed in greater detail herein.

Moreover, it should be appreciated that the above mappings of register offset addresses and register bit assignments in the MIU and the CIU's are merely exemplary in nature, and any alternate manners of assigning registers and/or assigning bits to specific functions may be used in the alternative.

Technical Function Controller

FIG. 24 illustrates a technical function (TECHNOFUNC) CIU 220 that is used to interface the core service interface for technology-specific functions. Generically, a CSI read/write sequencer 222 is configured to receive READ, WRITE and ADDR signals from the CSI bus, and to provide various SELECT signals to a series of multiplexers 230, 232 that control data paths into various configuration registers 226, 228. Each multiplexer is configured to receive the DATAOUT bus, as well as a default value. Moreover, each is configured to receive OBSERVE bits from the core circuitry. Each configuration register is also configured to output CONFIGURATION bits to the core, as well as to output to the DATAIN lines of the CSI bus via a multiplexer 224. The specific implementation of configuration information and observation information is highly dependent upon this specific implementation of the core and of the information in control that is required. Thus, the number and configuration of configuration registers will vary significantly for different applications. As such, the framework illustrated in FIG. 24 provides a flexible, yet powerful interface into the internal components of the core.

Test Verification Environment

Figure 26:
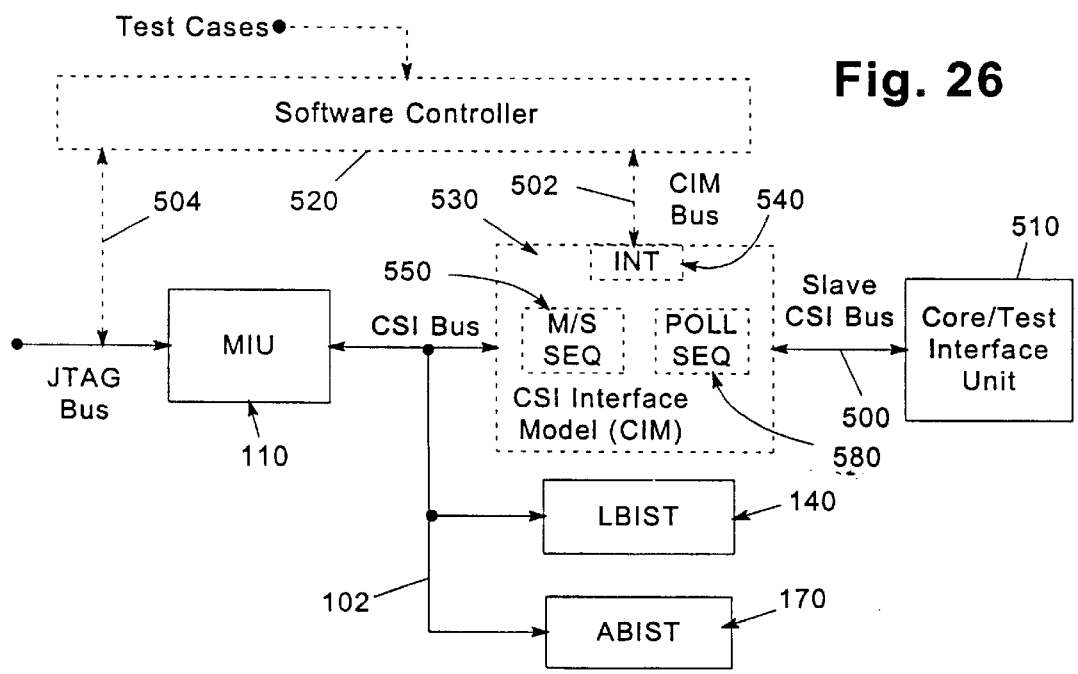
FIG. 26 is a block diagram of a test verification environment consistent with the invention.

FIG. 26 illustrates a test verification environment consistent with the invention. The environment includes a CSI interface model (CIM) 530 that plugs directly into CSI bus 102, in parallel with various other CIU's, e.g., LBIST 140 and ABIST 170, and in between CSI bus 102 and a Core/Test Interface Unit (CTIU) 510. CTIU 510 may be an actual core hardware representation or may be a software test model.

CIM 530 provides the ability to intercept CSI read and write operations originating from MIU 110 and directed to the CTIU 510 to verify the protocol and data/address supplied during the operation, to pass the command to the CTIU via a "slave CSI bus" 500, and/or to modify the response of the CTIU as desired, e.g., to delay a DATAGOOD response from the CTIU. CIM 530 also provides the ability to monitor CSI read/write operations between MIU 110 and other CIU's 140, 170 to verify the protocol and data/address content. CIM 530 also provides the ability to initiate poll operations to MIU 110 to verify the protocol and data/address content as the poll command is serviced by the MIU and directed to an attached CIU. Moreover, the ability is provided to initiate CSI read/write operations on slave CSI bus 500 to CTIU 510 to verify JTAG operation results and/or to initialize register contents.

As noted above, a CTIU may either be an actual core hardware model or may be a software test model. The software test model may be a reduced representation of the core hardware, and may be used to verify the MIU and other CIU's in the absence of an actual CTIU hardware representation and prior to full device simulation. Moreover, the configuration permits the substitution of an actual CTIU in place of the software test model without losing any of the automated check and verification capability.

A software controller 520 may also be used to convert and route high level test cases into commands on the JTAG bus 504 or to the CIM 530 via CIM bus 502 as appropriate. Software controller 520 is also capable of monitoring the JTAG bus or CIM bus 502. This configuration allow test cases to be written from a functional point of view without requiring the test case writer to be intimately familiar with the hardware interface. In addition, this configuration eliminates the need to manually verify each test case by automatically verifying protocol, data integrity and function.

As an example, a test case that does a read to CTIU 510 from the JTAG bus may be supplied to controller 520, which interprets the test case and initiates a READ to the CTIU on the JTAG bus. Controller 520 may also generate a CIM bus command telling the CIM to monitor the CSI bus for a read operation to the CTIU. The MIU then intercepts the JTAG command and starts a CSI READ operation on the CSI bus. The CIM intercepts the operation, verifies protocol and address, and then passes the operation to the CTIU on bus 500. The CTIU then responds as if it was on CSI bus 102, with the CTIU handshaking accordingly. The CIM again intercepts the operation, and verifies protocol and data. The CIM then completes the operation on the CSI bus with the passed data, and reports status, e.g., pass or fail, on CIM bus 502. The MIU completes the read operation on the JTAG bus, with controller 520 intercepting the results.

Figure 27:
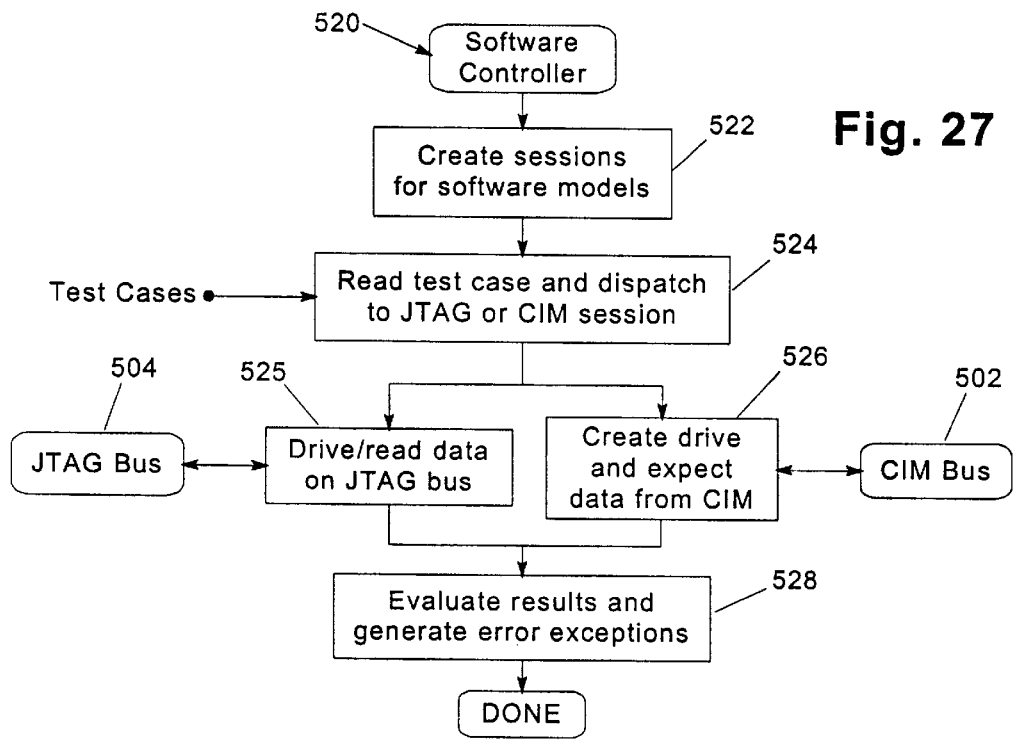
FIG. 27 is a flowchart illustrating the operation of the software controller of FIG. 26.

FIG. 27 illustrates one preferred implementation of software controller 520. Controller 520 is preferably implemented using a sequential hardware description language such as sequential VHDL, although a concurrent model may be used in the alternative. The controller generally operates by converting test cases created in a test case language from a high level JTAG functional operation standpoint to a software controller "packet interface". The CIM may then interface with this packet interface and use the input to monitor CSI operations and/or initiate CSI operations on either the master or slave CSI buses. The configuration allows test cases to be written from a functional point of view without requiring the test case writer to be intimately familiar with the hardware interface. In addition, the configuration typically eliminates the need to manually verify each test case by automatically verifying protocol, data integrity and function.

When executing one or more test cases during verification of an integrated circuit design, controller 520 begins in block 522 by creating one or more sessions for the various software models, e.g., CIM's, coupled to the controller. Next, in block 524, the controller reads a test case, e.g., supplied in a data file, and dispatches one or more test case commands from the test case to the JTAG bus or appropriate CIM session. Depending upon whether a JTAG or CIM operation is to be performed, either of blocks 525 or 526 is executed. For a JTAG operation, the appropriate data for a test case is driven and read back on JTAG bus 504 in block 525, using the standard JTAG protocol. For a CIM operation, block 526 drives CIM bus 502 and receives data therefrom when so provided by the CIM. Upon completion of either of blocks 525 or 526, block 528 is executed to evaluate the results and generate error exceptions (if any). Handling of a test case is then complete.

It should be appreciated that the generation of test cases is highly dependent upon the particular integrated circuit design subjected to verification. Moreover, it should be appreciated that such test case generation would be well within the abilities of one of ordinary skill in the art.

Returning to FIG. 26, a preferred implementation of CIM 530 includes circuitry implemented in both sequential and concurrent hardware description languages, e.g., sequential and concurrent VHDL. A sequential portion of the CIM includes an interface block INT 540 that provides the packet interface with software controller 520. The concurrent portion of the CIM includes two sequencers, a master/slave sequencer 550 and a poll sequencer 580.

The various components in CIM 530 may be implemented using any number of other design styles, including various combinations of concurrent and sequential models. However, by implementing much of CIM 530 in a concurrent hardware description language, a significant benefit is realized in that it is possible to retrieve and/or monitor signals within the CIM at the same time as other signals in the integrated circuit design are being retrieved and/or monitored. By working with simulation waveforms from both PIB models and IC circuitry, problem resolution is greatly facilitated. In addition, fine-tuned overlap between PIB initiated POLL commands and JTAG initiated CSI Read/Write operations may be achieved with comparatively little difficulty.

Figure 28:
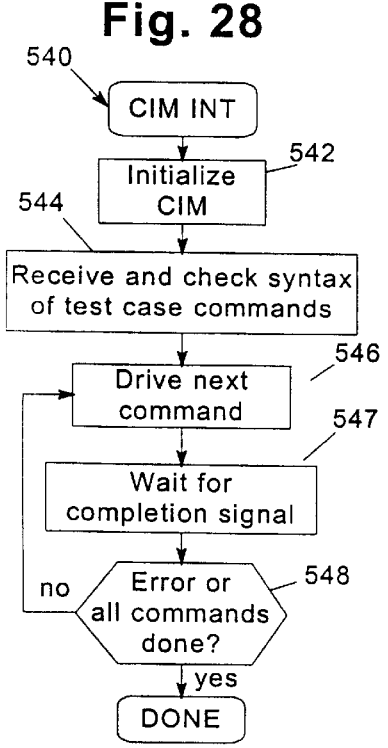
FIG. 28 is a flowchart illustrating the operation of the INT sequential portion of the CSI interface model of FIG. 26.

FIG. 28 illustrates one suitable program flow for INT 540, which begins in block 542 by initializing the CIM. Next, block 544 receives the test case commands supplied to the CIM over CIM bus 502 and checks the syntax thereof, and may signal an error back to the software controller if an invalid command is received. Next, block 546 drives a command to the appropriate sequencer 550, 580, e.g., as one or more test case control word (TCCW) packets over an internal CIM interface. In addition, a valid command signal TCCWVAL may also be activated to indicate that a command is ready over the interface. Next, block 547 waits for a completion signal, e.g., TCCWDONE, from sequencer 550, and in response, deasserts the valid command signal TCCWVAL. Block 548 then determines whether processing of all pending commands from the CIM bus is complete or an error has occurred. If not, control passes back to block 546 to handle the additional commands. If the test case is complete or an error was detected, a pass/fail status is output, an error is signaled back to the software controller (as appropriate) and the status of INT 540 is output. The program flow of INT 540 is then complete.

Figure 29:
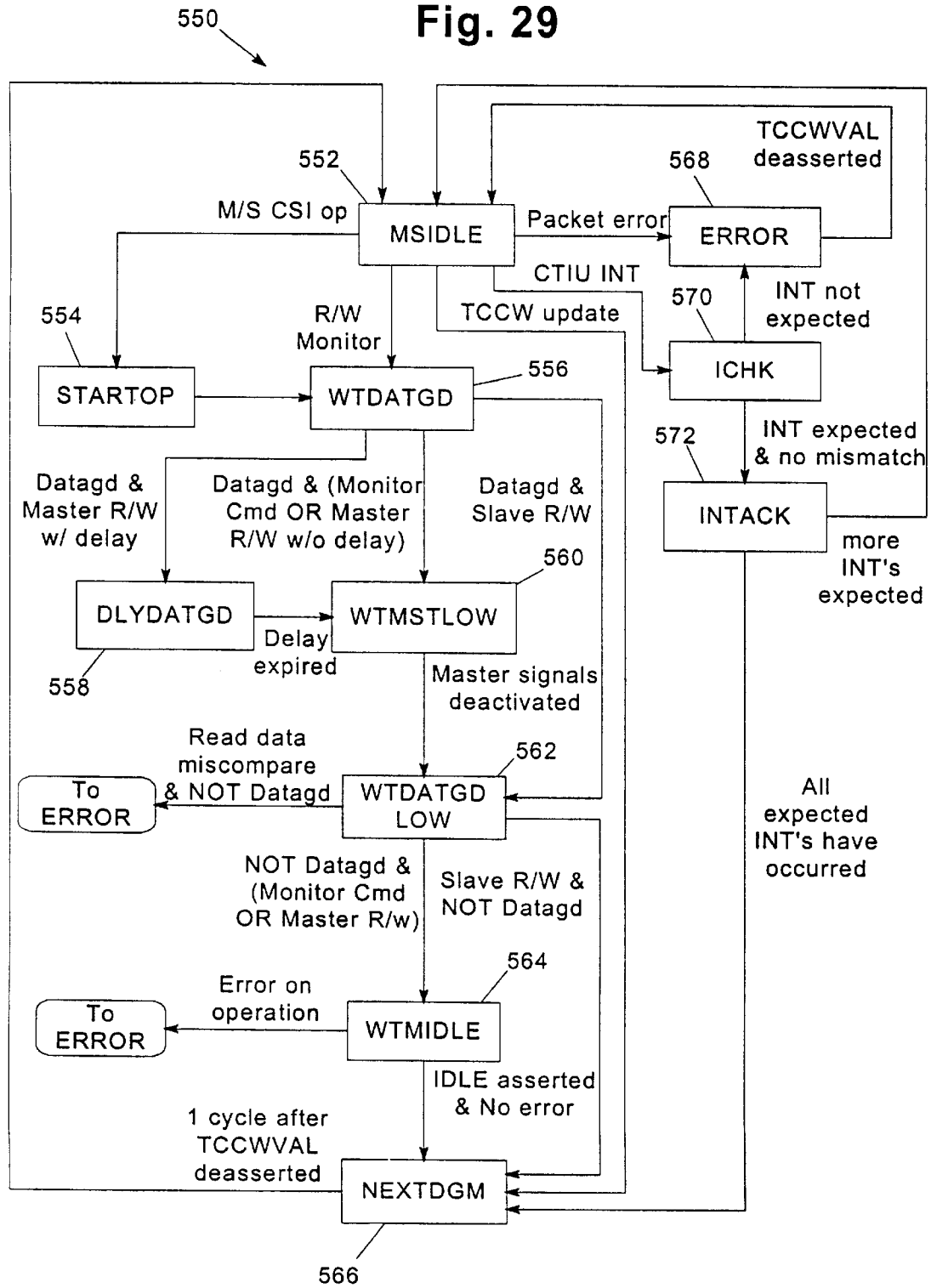
FIG. 29 is a state diagram illustrating the operation of the master/slave sequencer of FIG. 26.

FIG. 29 is one suitable state diagram implementation of master/slave sequencer 550. Sequencer 550 generally operates to process test case commands received from software controller 520 via INT 540. Sequencer 550 initially begins in state 552 by waiting for either a CSI operation to be started by the MIU or an interrupt from the CTIU. A transition to any of states 554, 556, 566, 568 and 570 may occur in different circumstances.

A transition to state 554 occurs in response to a CSI operation initiated on the master CSI bus to the CTIU, referred to as a master CSI operation, or a CSI operation initiated by the CIM to the CTIU (e.g., in response to a command from the software controller) over the slave CSI bus, also referred to as a slave CSI operation. In state 554, the CSI signals received from the master CSI bus are forwarded to the slave CSI bus to perform the operation on the CTIU. A state transition then occurs to state 556 to wait for the DATAGOOD signal returned by the CTIU over the slave CSI bus, indicating that the operation has been performed by the CTIU. Also, returning to state 552, a transition to state 556 also occurs in response to a read/write monitor command supplied to the CIU via the software controller, where it is desirable to monitor a CSI operation to another CIU on the master CSI bus with the CIM.

Depending upon several factors, state 556 may transition to any of states 558, 560 or 562. A transition to state 558 occurs if a master CSI operation is being processed with a delay bit set in the CIM upon receipt of the DATAGOOD signal from the slave CSI bus. The delay bit, which may be supplied, for example, in a command from the software controller, indicates whether or not the DATAGOOD signal from the slave CSI bus should be delayed a number of cycles prior to passing the signal back to the MIU over the master CSI bus. State 558 therefore waits a specified number of cycles prior to transitioning to state 560. The number of cycles to delay may be fixed, or may be varied, e.g., based upon a command from the software controller.

In addition to a transition from state 558, state 560 may also be transitioned to from state 556 in the event that either a monitor command is being processed by the CIM or if a master CSI operation is being processed with the delay bit cleared. State 560 therefore asserts the DATAGOOD signal over the master CSI bus to the MIU, and then waits for deactivation of the CSI READ/WRITE signals from the MIU over the CSI bus. When this occurs, a transition is performed to state 562 to wait for deactivation of the DATAGOOD signal either from the slave CSI bus, as in the case of a master CSI operation, or from the CIU being monitored on the master CSI bus. As discussed above, a state transition may also occur from state 556 directly to state 562, which occurs when a slave CSI operation is being performed by the CIM. In this event, state 562 waits for deactivation of the DATAGOOD signal from the slave CSI bus.

A transition occurs from state 562 to state 564 in response to the DATAGOOD signal being deasserted when processing a monitor command or master CSI operation. State 564 waits for assertion of the IDLE signal on the master CSI bus, indicating completion of the CSI operation on the master CSI bus. A transition occurs to state 566 if this occurs and no data compare errors were recorded in state 562 during a monitor or master read operation. In this state, INT 530 is informed that the current packet being processed should be invalidated by asserting TCCWDONE. State 566 then transitions back to state 552 upon deassertion of TCCWVAL by INT 540, indicating processing of the command is complete.

Returning to state 564, if an error was detected in state 562, e.g., in response to a data miscompare in the read return data during a monitor or master read command, a transition occurs to state 568 to report the error to the test case depending upon whether or not error messages are enabled. A "fail" bit is set in this state so that the test case will fail and be reported back to the software controller as appropriate. A transition then occurs back to state 552.

Returning to state 562, if the DATAGOOD signal is deasserted when processing a slave CSI operation, and if no error is indicated in the data received from the slave CSI bus, control passes to state 566. On the other hand, if an error is indicated in the data, e.g., in response to the read return data not matching the expected data as contained in the command passed over the CIM bus from the software controller, control is passed to state 568 to report the error.

Returning to state 552, receipt of a packet error in the current command being processed causes a state transition to state 568. If a TCCW update command is received, a state transition occurs to state 566 to invalidate the current packet and indicate completion of the processing thereof to INT 540.

It may also be desirable with the test environment disclosed herein to enable automatic verification of hardware functions within a simulation model using an interrupt/interrupt acknowledge scheme between the CTIU and CIM. With this scheme, when a predetermined operation, e.g., a scan operation, a scan ring select, a clock command, an ABIST or LBIST completion, etc., occurs, the appropriate information may be stored in one or more interrupt information registers in the CTIU and an interrupt asserted to the CIM. The CIM may therefore monitor interrupt activity by the CTIU and return either an interrupt acknowledge or error indication to the software controller depending upon whether an interrupt was expected. The test case writer then has the capability of determining which interrupts to expect and what type of information to expect in the interrupt information registers when the interrupt occurs. With this scheme, additional registers, signals, etc. may be captured into the interrupt information registers and checked with specific test environment commands within a test case, allowing for automatic verification of signal states without having to manually observe output waveforms. An additional benefit is the ability to detect when something is occurring in the CTIU that shouldn't be happening. Moreover, there is generally no limit on the number of signals that can be monitored in a design or the amount of information that may be stored. Furthermore, if more than one event is expected, either an ordered or unordered check of events may be supported.

To support this scheme, sequencer 550 may be configured such that, if an interrupt is received from the CTIU, a transition occurs from state 552 to state 570 to check the received interrupt vector with the expected interrupt vector from the interrupt packet provided by the software controller. The CIM's copy of the expected interrupts is compared with the interrupt register from the CTIU to ensure that all interrupts that are active are expected. If not, a transition occurs to state 568 to signal the error. If so, a transition occurs to state 572 to reset or acknowledge the received interrupts back to the CTIU. Then, based upon whether more interrupts are expected, a transition occurs to either of states 552 or 566. A transition occurs to state 566 when no additional interrupts are expected so that a new command may be received from INT 540. Otherwise, a transition occurs to state 552 to wait for additional interrupts.

Figure 30:
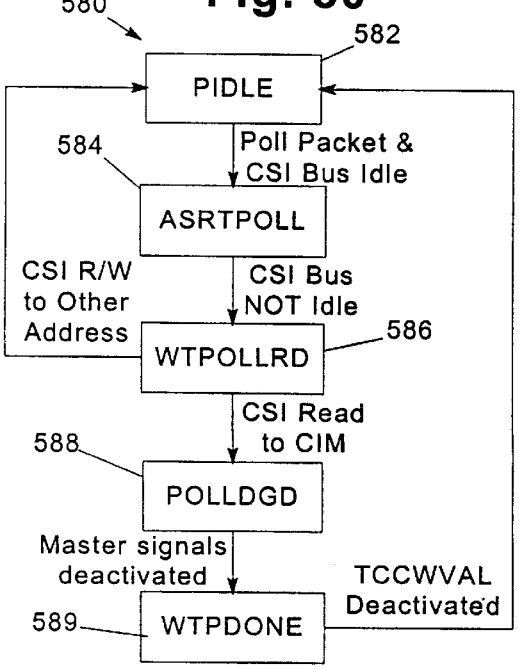
FIG. 30 is a state diagram illustrating the operation of the poll sequencer of FIG. 26.

FIG. 30 is one suitable state diagram implementation of poll sequencer 580, which generally processes a POLL command in the same manner described above with respect to FIG. 6. The sequencer begins in state 582 waiting for a packet indicating that a POLL command over the master CSI bus is to be initiated by the CIM. When the master CSI bus goes idle upon receipt of such a command, a transition occurs to state 584 to assert the POLL address on the master CSI bus and wait for the master IDLE signal to be deasserted, indicating that the MIU is ready to process the POLL operation. Once the IDLE signal is deasserted, a transition occurs to state 586 to wait for a READ operation to the CIM register specified in the POLL address. If a read is detected to any other address, a transition occurs back to state 582 to wait for an idle condition on the master CSI bus. If a read is detected to the CIM register, however, a transition occurs to state 588 to assert DATAGOOD and DATAIN on the master CSI bus. DATAIN contains address and data for the subsequent write operation to be initiated by the MIU. A state transition then occurs to state 589 upon deactivation of the appropriate master CSI READ signal from the master CSI bus. State 589 waits for completion of the CSI write portion of the poll sequence, which is monitored by sequencer 550. TCCWVAL is deactivated when the write operation completes, e.g., in state 566 of sequencer 550, resulting in sequencer 580 transitioning back to state 582.

Various modifications may be made to the illustrated embodiments without departing from the spirit and scope of the invention. Therefore, the invention lies solely in the claims hereinafter appended.

What is claimed is:

1. An integrated circuit device, comprising:
   (a) a plurality of cores disposed on the integrated circuit device;
   (b) a function interface coupling at least one of the plurality of cores to a function access port to permit external data transfer with the integrated circuit device during regular operation thereof, and
   (c) a service interface coupling the plurality of cores to a service access port to permit external data transfer with the integrated circuit device in connection with a predetermined service operation responsive to a request received over the service interface, the service interface including:
      (1) a plurality of core interface units integrated with the plurality of cores on the integrated circuit device, each core interface unit coupled to a core from the plurality of cores; and (2) a master interface unit integrated with the plurality of cores on the integrated circuit device, the master interface unit coupled between the service access port and the plurality of core interface units and configured to request at least a selected one of the plurality of core interface units to initiate execution of the predetermined service operation.

2. The integrated circuit device of claim 1, further comprising a core interface bus coupled between the master interface unit and each of the plurality of core interface units, wherein each core interface unit has a unique address on the bus.

3. The integrated circuit device of claim 2, wherein at least one core interface unit includes a bounce circuit arrangement, the bounce circuit arrangement configured to request another of the plurality of core interface units to initiate execution of a second predetermined service operation in response to receipt of a request from the master interface unit.

4. The integrated circuit device of claim 2, wherein each core interface unit includes at least one status signal, and wherein the master interface unit includes a status circuit arrangement coupled to receive each of the status signals from the plurality of core interface units and provide therefrom a global status signal to the master interface unit, the status circuit arrangement configured to perform a logical-OR operation on the plurality of status signals.

5. The integrated circuit device of claim 2, wherein at least a portion of the core interface units are daisy chained core interface units coupled to one another in a daisy chain arrangement, with each daisy chained core interface unit coupled to provide a daisy chain signal to a next daisy chained core interface unit and thereby initiate a predetermined operation in the next daisy chained core interface unit.

6. The integrated circuit device of claim 5, wherein each daisy chained core interface unit provides the daisy chain signal to the next daisy chained core interface unit upon completion of a predetermined operation, wherein the daisy chained core interface units operate sequentially.

7. The integrated circuit device of claim 6, wherein the plurality of core interface units includes a sequence master core interface unit, the sequence master core interface unit configured to initiate the predetermined operations in the daisy chain arrangement of core interface units in response to a sequence initiation signal.

8. The integrated circuit device of claim 7, wherein the sequence initiation signal is selected from the group consisting of a software-initiated reset signal, a hardware-initiated power on reset signal, a command signal initiated by the master interface unit over the core interface bus, and combinations thereof.

9. The integrated circuit device of claim 8, wherein a selected core interface unit in the daisy chain arrangement is configured to provide a block signal to the sequence master core interface unit to inhibit initiation of a predetermined operation in the daisy chain arrangement.

10. The integrated circuit device of claim 7, wherein the sequence master core interface unit is further configured to output a mode select signal to at least a portion of the daisy chain arrangement of core interface units to control the predetermined operations performed thereby.

11. The integrated circuit device of claim 2, wherein each core interface unit is configured to output at least one status bit over the bus in response to a signal generated by the master interface unit.

12. The integrated circuit device of claim 11, wherein the bus includes a plurality of lines, and wherein each core interface unit is mapped to a unique line from the bus based upon the address thereof such that each core interface unit outputs the status bit therefor over the unique line therefor in response to the status request signal.

13. The integrated circuit device of claim 12, wherein the status request signal includes an exist query signal, and wherein each core interface unit outputs an exist signal over the unique line therefor from the bus, and wherein the master interface unit determines the address of each existing core interface unit by polling the unique line from the bus associated therewith and mapping the unique line to the address thereof.

14. The integrated circuit device of claim 13, wherein the master interface module is further configured to request status information from a specific core interface unit by deriving the address thereof from the unique line from the bus asserted by the specific core interface unit.

15. The integrated circuit device of claim 12, wherein the status request signal requests a common status bit from each core interface unit such that the plurality of status bits represent a word received by the master interface unit, and wherein each status bit is selected from the group consisting of an attention bit, an error bit, a test complete bit, a test in progress bit, a test pass bit, a test fail bit, and combinations thereof.

16. The integrated circuit device of claim 2, wherein the function access port is coupled to at least one of the plurality of cores through a system bus.

17. The integrated circuit device of claim 16, wherein at least one of the cores includes an internal register, and wherein the master interface unit includes:

(a) a processing unit configured to issue the request for the predetermined service operation; and (b) a multiplexer configured to selectively couple the internal register to either the system bus or the processing unit.

18. The integrated circuit device of claim 2, wherein each core interface unit includes a test controller.

19. The integrated circuit device of claim 18, wherein the test controller in at least one core interface unit includes an array built-in self-test (ABIST) controller.

20. The integrated circuit device of claim 1, wherein the core includes a plurality of arrays, each array including an engine therefor coupled to the test controller, wherein the test controller is configured to monitor completion and status of an ABIST operation on each engine.

21. The integrated circuit device of claim 20, wherein each operational engine from the plurality of engines outputs a done signal to the test controller upon completion of an ABIST operation, and wherein the test controller includes a done mask that filters done signals from non-operational engines to determine when all operational engines have completed the operation.

22. The integrated circuit device of claim 1, wherein the service access port includes a test access port coupled to a Joint Test Action Group (JTAG) interface, and wherein the master interface unit is configured to process JTAG-format commands received from the JTAG interface.

23. A data processing system, comprising:

(a) a processing unit coupled to a storage unit through a bus; and (b) an integrated circuit device disposed in one of the processing and storage units, the integrated circuit device including:

(1) a plurality of cores;

(2) a function interface coupling at least one of the plurality of cores to a function access port to permit external data transfer with the integrated circuit device during regular operation thereof; and (3) a service interface coupling the plurality of cores to a service access port to permit external data transfer with the integrated circuit device in connection with a predetermined service operation responsive to a request received over the service interface, the service interface including:

(i) a plurality of core interface units integrated with the plurality of cores on the integrated circuit device, each core interface unit coupled to a core from the plurality of cores; and (ii) a master interface unit integrated with the plurality of cores on the integrated circuit device, the master interface unit coupled between the service access port and the plurality of core interface units and configured to request at least a selected one of the plurality of core interface units to initiate execution of the predetermined service operation.

24. A method of accessing a plurality of interconnected cores disposed on an integrated circuit device of the type including a function interface coupling at least one of the plurality of cores to a function access port to permit external data transfer with the integrated circuit device during regular operation thereof, the method comprising:

(a) receiving a service request through a service access port separate from the function interface and coupled to a master interface unit integrated with the plurality of cores on the integrated circuit device;

(b) generating in response to the service request a first predetermined signal to at least a selected one of a plurality of core interface units integrated with the plurality of cores on the integrated circuit device; and (c) performing a predetermined service operation with the selected core interface unit-in response to the first predetermined signal.

25. A method of sequencing through a plurality of predetermined operations performed by a plurality of core interface units integrated with a plurality of interconnected cores disposed on an integrated circuit device and coupled to one another through a core interface bus, with the plurality of core interface units further coupled to one another in a daisy chain arrangement with each core interface unit configured to provide a daisy chain signal to a next core interface unit in the daisy chain arrangement, the method comprising, for each core interface unit in the daisy chain arrangement:

(a) performing a predetermined operation in response to a daisy chain signal received from a preceding core interface unit in the daisy chain arrangement; and (b) providing a daisy chain signal to the next core interface unit in the daisy chain arrangement.

26. A method of retrieving status information from a plurality of core interface units integrated with a plurality of interconnected cores disposed on an integrated circuit device, the plurality of core interface units coupled to one another and a master interface unit through a core interface bus, the method comprising:

(a) issuing a request to each core interface unit with the master interface unit;

(b) for each core interface unit, outputting a status bit to the master interface unit over a unique line in the core interface bus in response to the request; and (c) polling the unique lines in the core interface bus with the master interface unit.

27. The method of claim 26, wherein the request issued by the master interface unit is an exist request, wherein each core interface unit coupled to the core interface bus asserts an exist signal over its respective unique line in response to the exist request, the method further comprising determining the existence of core interface units based upon the lines asserted by the core interface units.

28. The method of claim 27, further comprising determining a core interface bus address for each core interface unit based upon a mapping of the unique lines to selected addresses on the core interface bus.

29. A program product, comprising:

(a) a hardware definition program that defines a service interface circuit arrangement configured to be integrated with a plurality of cores and a function interface on an integrated circuit device, the function interface configured to couple at least one of the plurality of cores to a function access port to permit external data transfer with the integrated circuit device during regular operation thereof, the service interface circuit arrangement configured to couple the plurality of cores to a service access port to permit external data transfer with the integrated circuit device in connection with a predetermined service operation responsive to a request received over the service interface, the service interface including:

(i) a plurality of core interface unit circuit arrangements configured to be integrated with the plurality of cores on the integrated circuit device, each core interface unit circuit arrangement configured to be coupled to a core from the plurality of cores; and (ii) a master interface unit circuit arrangement configured to be integrated with the plurality of cores on the integrated circuit device, the master interface unit circuit arrangement configured to be coupled between the service access port and the plurality of core interface unit circuit arrangements and to request at least a selected one of the plurality of core interface unit circuit arrangements to initiate execution of the predetermined service operation; and (b) a signal bearing media bearing the hardware definition program.

30. The program product of claim 29, wherein the master interface unit circuit arrangement and the plurality of core interface unit circuit arrangements are coupled to one another by a core service interface bus, and wherein the service interface further includes an interface behavior model coupled to the core service interface bus between the master interface unit circuit arrangement and a core/test interface unit circuit arrangement, the interface behavior model configured to test a bus operation between the master interface unit circuit arrangement and the core/test interface unit circuit arrangement by intercepting the bus operation with the interface behavior model.

31. The program product of claim 30, wherein the interface behavior model is further configured to monitor a bus operation between the master interface unit circuit arrangement and at least one core interface unit circuit arrangement, to generate a poll operation to the master interface unit circuit arrangement, and to generate a bus operation to the core/test interface unit circuit arrangement.

32. The program product of claim 30, wherein the core/test interface unit circuit arrangement includes a software model of a representative test environment circuit arrangement.

33. A method of testing a multi-core integrated circuit device design, the method comprising:

(a) coupling an interface behavior model between a core service interface circuit arrangement and a core/test interface unit circuit arrangement, the core service interface circuit arrangement including a plurality of core interface units circuit arrangement, each integrated with a core circuit arrangement in the integrated circuit device design, and a master interface unit circuit arrangement coupled to the plurality of core interface unit circuit arrangements over a core service interface bus and configured to request at least a selected one of the plurality of core interface unit circuit arrangements to initiate execution of a predetermined service operation; and (b) testing a bus operation between the master interface unit circuit arrangement and the core/test interface unit circuit arrangement by intercepting the bus operation with the interface behavior model.

34. The method of claim 33, wherein the core service interface bus is a multi-drop bus, and wherein the interface behavior model is coupled to the core service interface bus in parallel with the plurality of core interface unit circuit arrangements.

35. The method of claim 34, further comprising monitoring with the interface behavior model a bus operation between the master interface unit circuit arrangement and at least one core interface unit circuit arrangement.

36. The method of claim 35, further comprising generating a poll operation to the master interface unit circuit arrangement with the interface behavior model, and monitoring in response thereto a bus operation between the master interface unit circuit arrangement and at least one core interface unit circuit arrangement.

37. The method of claim 34, wherein the interface behavior model is coupled to the core/test interface unit circuit arrangement over a slave core service interface bus, and wherein testing the bus operation includes intercepting a bus operation from the master interface unit circuit arrangement, verifying at least one of the protocol, address and data supplied with the bus operation, and passing the bus operation to the core/test interface unit circuit arrangement over the slave core service interface bus.

38. The method of claim 37, further comprising generating a bus operation to the core/test interface unit circuit arrangement from the interface behavior model.

39. The method of claim 34, further comprising controlling the interface behavior model with a software controller.

40. The method of claim 39, wherein the interface behavior model includes a model interface to the software controller, the model interface implemented in a sequential hardware description language.

41. The method of claim 33, wherein at least a portion of the interface behavior model that intercepts the bus operation is implemented in a concurrent hardware description language.

42. The integrated circuit device of claim 2, wherein the bus includes at least one serial transmission line, the integrated circuit device further comprising first and second serializer/deserializers coupled at opposing ends of the serial transmission line.

43. The integrated circuit device of claim 7, wherein the daisy chain arrangement of core interface units includes at least one built-in self-test controller, wherein the predetermined operation for the built-in self-test controller is performing built-in self-test on selected components of the integrated circuit device.

44. The integrated circuit device of claim 17, wherein the master interface unit further includes a datapath selection unit coupled to a select line on the multiplexer, the datapath selection unit configured to grant priority to system bus operations over operations requested by the processing unit of the master interface unit.

45. The integrated circuit device of claim 20, wherein the test controller is configured to determine when all engines have completed the operation via a counter that is configured to expire upon completion of the operation on an engine associated with a largest array from the plurality of arrays.

46. The method of claim 24, wherein each core interface unit is coupled to the master interface unit by a core interface bus, with each core interface unit having a unique address on the bus, and wherein generating the first predetermined signal includes issuing a command over the bus, the command having associated therewith the address for the selected core interface unit.

47. The method of claim 46, wherein at least one core interface unit includes a bounce circuit arrangement, and wherein performing the predetermined service operation includes requesting with the selected core interface unit another of the plurality of core interface units to initiate execution of a second predetermined service operation in response to receipt of the first predetermined signal.

48. The method of claim 46, wherein each core interface unit includes at least one status signal, the method further comprising receiving each of the status signals from the plurality of core interface units, and providing therefrom a global status signal to the master interface unit by performing a logical-OR operation on the plurality of status signals.

49. The method of claim 46, wherein at least a portion of the core interface units are daisy chained core interface units coupled to one another in a daisy chain arrangement, the method further comprising, with each daisy chained core interface unit, providing a daisy chain signal to a next daisy chained core interface unit to initiate a predetermined operation in the next daisy chained core interface unit.

50. The method of claim 46, further comprising outputting from each core interface unit at least one status bit in response to a signal generated by the master interface unit, wherein the bus includes a plurality of lines, wherein each core interface unit is mapped to a unique line from the bus based upon the address thereof such that each core interface unit outputs the status bit therefor over the unique line therefor in response to the status request signal, wherein the status request signal includes an exist query signal, and wherein each core interface unit outputs an exist signal over the unique line therefor from the bus, the method further comprising determining the address of each existing core interface unit by polling the unique line from the bus associated therewith and mapping the unique line to the address thereof.

51. The method of claim 50, further comprising requesting status information from a specific core interface unit by deriving the address thereof from the unique line from the bus asserted by the specific core interface unit.

52. The method of claim 51, wherein the status request signal requests a common status bit from each core interface unit such that the plurality of status bits represent a word received by the master interface unit, and wherein each status bit is selected from the group consisting of an attention bit, an error bit, a test complete bit, a test in progress bit, a test pass bit, a test fail bit, and combinations thereof.

53. The method of claim 46, wherein at least one core interface unit includes an array built-in self-test (ABIST) controller coupled to a plurality of ABIST engines, each ABIST engine coupled to an array within a core on the integrated circuit device for performing an ABIST operation thereon, the method further comprising monitoring completion and status of the ABIST operation on each engine with the ABIST controller.

54. The method of claim 53, wherein each operational engine from the plurality of ABIST engines outputs a done signal to the ABIST controller upon completion of an ABIST operation, and wherein monitoring completion and status of the ABIST operations includes performing a logical-AND of each done signal, including filtering non-existent done signals from non-operational ABIST engines with a done mask.

55. The method of claim 53, wherein monitoring completion and status of the ABIST operations includes determining when all ABIST engines have completed the operation via a counter that is configured to expire upon completion of the operation on an engine associated with a largest array from the plurality of arrays.

56. The method of claim 25, wherein providing the daisy chain signal with each core interface unit is performed after performing the predetermined operation therefor such that the core interface units operate sequentially.

57. The method of claim 25, further comprising receiving a sequence initiation signal with a first core interface unit from the daisy chain arrangement and thereafter providing the daisy chain signal to the next core interface unit therefor in the daisy chain arrangement, wherein the sequence initiation signal is selected the group consisting of a software-initiated reset signal, a hardware-initiated power on reset signal, a command signal initiated by a master interface unit over the core interface bus, and combinations thereof.

58. The method of claim 25, further comprising inhibiting a predetermined operation in the daisy chain arrangement by providing an inhibit signal with a selected core interface unit in the daisy chain arrangement.

59. The method of claim 25, further comprising providing a mode select signal to at least a portion of the daisy chain arrangement of core interface units to control the predetermined operations performed thereby.

60. The method of claim 26, wherein the core interface bus includes a data bus with a plurality of lines, wherein the unique line for each core interface unit is one of the plurality of lines in the data bus, and wherein polling the unique lines in the core interface bus includes reading the data bus.

61. The method of claim 28, further comprising retrieving identification information about a selected core interface unit by performing a read operation to a predetermined register in the selected core interface unit, wherein the core interface bus address of the predetermined register is determined using the core interface bus address for the selected core interface unit.

62. The method of claim 61, wherein the core interface bus address of the predetermined register is a fixed offset from the core interface bus address of the selected core interface unit.

63. The method of claim 26, further comprising, for each core interface unit, outputting a handshake signal to the master interface unit to indicate the validity of the status bit, wherein polling the unique lines in the core interface bus is responsive to the handshake signals received from the plurality of core interface units.

64. The program product of claim 29, wherein the signal bearing media includes at least one of a transmission type media and a recordable media.

65. An integrated circuit device, comprising:
(a) a plurality of cores disposed on the integrated circuit device;
(b) a function interface coupling at least one of the plurality of cores to a function access port to permit external data transfer with the integrated circuit device during regular operation thereof; and
(c) a service interface coupling the plurality of cores to a service access port to permit external data transfer with the integrated circuit device in connection with a predetermined service operation, the service interface including:
 (1) a plurality of core interface units integrated with the plurality of cores on the integrated circuit device, each core interface unit coupled to a core from the plurality of cores; and
 (2) a master interface unit integrated with the plurality of cores on the integrated circuit device, the master interface unit coupled between the service access port and the plurality of core interface units and configured to request at least a selected one of the plurality of core interface units to initiate execution of the predetermined service operation;
wherein at least a portion of the core interface units are daisy chained core interface units coupled to one another in a daisy chain arrangement, with each daisy chained core interface unit coupled to provide a daisy chain signal to a next daisy chained core interface unit and thereby initiate a predetermined operation in the next daisy chained core interface unit, and wherein the plurality of core interface units includes a sequence master core interface unit, the sequence master core interface unit configured to initiate the predetermined operations in the daisy chain arrangement of core interface units in response to a sequence initiation signal.

66. An integrated circuit device, comprising:
(a) a plurality of cores disposed on the integrated circuit device;
(b) a function interface coupling at least one of the plurality of cores to a function access port to permit external data transfer with the integrated circuit device during regular operation thereof; and
(c) a service interface coupling the plurality of cores to a service access port to permit external data transfer with the integrated circuit device in connection with a predetermined service operation, the service interface including:
 (1) a plurality of core interface units integrated with the plurality of cores on the integrated circuit device, each core interface unit coupled to a core from the plurality of cores;
 (2) a master interface unit integrated with the plurality of cores on the integrated circuit device, the master interface unit coupled between the service access port and the plurality of core interface units and configured to request at least a selected one of the plurality of core interface units to initiate execution of the predetermined service operation; and
 (3) a core interface bus coupled between the master interface unit and each of the plurality of core interface units, wherein each core interface unit has a unique address on the bus, wherein each core interface unit is configured to output at least one status bit over the bus in response to a signal generated by the master interface unit, wherein the bus includes a plurality of lines, and wherein each core interface unit is mapped to a unique line from the bus based upon the address thereof such that each core interface unit outputs the status bit therefor over the unique line therefor in response to the status request signal.

67. An integrated circuit device, comprising:
(a) a plurality of cores disposed on the integrated circuit device, a first core among the plurality of cores including a plurality of arrays, each array including an engine;

(b) a function interface coupling at least one of the plurality of cores to a function access port to permit external data transfer with the integrated circuit device during regular operation thereof; and (c) a service interface coupling the plurality of cores to a service access port to permit external data transfer with the integrated circuit device in connection with a predetermined service operation, the service interface including:

(1) a plurality of core interface units integrated with the plurality of cores on the integrated circuit device, each core interface unit coupled to a core from the plurality of cores, a first core interface unit from the plurality of core interface units coupled to the first core, the first core interface unit including an array built-in self-test (ABIST) controller coupled to the engine in each of the plurality of arrays in the first core, wherein the ABIST controller is configured to monitor completion and status of an ABIST operation on each engine; and (2) a master interface unit integrated with the plurality of cores on the integrated circuit device, the master interface unit coupled between the service access port and the plurality of core interface units and configured to request at least a selected one of the plurality of core interface units to initiate execution of the predetermined service operation;

wherein each operational engine in each of the plurality of arrays is configured to output a done signal to the ABIST controller upon completion of an ABIST operation, and wherein the ABIST controller includes a done mask that filters done signals from non-operational engines to determine when all operational engines have completed the operation.

* * * * *